(12) United States Patent
Mizukoshi et al.

(10) Patent No.: US 9,461,919 B2
(45) Date of Patent: Oct. 4, 2016

(54) NETWORK SYSTEM, METHOD, APPARATUS, AND PROGRAM

(71) Applicant: NEC Corporation, Tokyo (JP)

(72) Inventors: Yasuhiro Mizukoshi, Tokyo (JP); Makoto Fujinami, Tokyo (JP); Yoshiyuki Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/440,615

(22) PCT Filed: Nov. 15, 2013

(86) PCT No.: PCT/JP2013/080875
§ 371 (c)(1),
(2) Date: May 5, 2015

(87) PCT Pub. No.: WO2014/077352
PCT Pub. Date: May 22, 2014

(65) Prior Publication Data
US 2015/0295833 A1    Oct. 15, 2015

(30) Foreign Application Priority Data

Nov. 16, 2012 (JP) ................................. 2012-252426

(51) Int. Cl.
*H04L 12/28* (2006.01)
*H04W 4/00* (2009.01)
(Continued)

(52) U.S. Cl.
CPC ........... *H04L 47/125* (2013.01); *H04L 45/306* (2013.01); *H04W 28/0289* (2013.01); *H04L 45/22* (2013.01); *H04W 8/082* (2013.01); *H04W 40/02* (2013.01)

(58) Field of Classification Search
CPC ............... H04W 8/082; H04W 28/02; H04W 28/0289; H04W 28/08; H04W 28/10; H04W 40/02; H04L 12/717; H04L 12/803; H04L 45/00; H04L 45/22; H04L 45/38; H04L 45/306; H04L 47/00; H04L 47/10; H04L 47/125; H04L 49/25
USPC ................ 370/216–228, 229–231, 235–239, 370/242–246, 250–252, 389, 391–392, 370/400–411; 709/224, 230–244
See application file for complete search history.

(56) References Cited

U.S. PATENT DOCUMENTS 8,103,310 B1    1/2012  Srinivas et al.
8,432,871 B1 *  4/2013  Sarnaik ............ H04W 28/0289
                                                      370/331

(Continued)

FOREIGN PATENT DOCUMENTS

JP   2012-175576 A    9/2012
RU   2 461 992 C2     6/2011
WO   WO 2012/035697 A1  3/2012

OTHER PUBLICATIONS

International Search Report (ISR) (PCT Form PCT/ISA/210), in PCT/JP2013/080875, dated Jan. 14, 2014.

(Continued)

*Primary Examiner* — Tri H Phan
(74) *Attorney, Agent, or Firm* — McGinn IP Law Group, PLLC

(57) ABSTRACT

A switch is provided between a first network and a second network and an offloading determination unit determines whether or not to offload traffic for the first network, and configures an offload path to bypass the first network for the switch when the offloading is performed. When the traffic is offloaded, the switch forwards a packet to be offloaded to the offload path.

30 Claims, 21 Drawing Sheets

(51) Int. Cl.
*H04L 12/803* (2013.01)
*H04L 12/725* (2013.01)
*H04W 28/02* (2009.01)
*H04W 40/02* (2009.01)
*H04W 8/08* (2009.01)
*H04L 12/707* (2013.01)

(56) References Cited

U.S. PATENT DOCUMENTS

| | | | | |
|---|---|---|---|---|
| 8,493,851 | B2 * | 7/2013 | Fan | H04L 12/4633 370/230 |
| 8,547,835 | B2 * | 10/2013 | Haddad | H04L 29/12405 370/230 |
| 9,019,861 | B2 * | 4/2015 | Matsuo | H04W 40/12 370/252 |
| 2010/0296459 | A1 | 11/2010 | Miki et al. | |
| 2011/0058479 | A1 | 3/2011 | Chowdhury | |
| 2011/0075557 | A1 * | 3/2011 | Chowdhury | H04L 12/14 370/230 |
| 2011/0075675 | A1 * | 3/2011 | Koodli | H04L 12/14 370/401 |
| 2011/0320588 | A1 | 12/2011 | Raleigh | |
| 2012/0076121 | A1 | 3/2012 | Choi et al. | |
| 2013/0142070 | A1 | 6/2013 | Matsuo et al. | |

OTHER PUBLICATIONS

3GPP TR 23.829, V10.0.1 (Oct. 2011).
3GPP TS 23.402, V11.4.0 (Sep. 2012).
3GPP TS 23.401, V11.3.0 (Sep. 2012).
3GPP TS 23.228, V11.6.0 (Sep. 2012).
Extended European Search Report dated Jun. 1, 2016.
Russian Office Action dated Jun. 29, 2016 with an English translation thereof.

* cited by examiner

RELATED ART

NETWORK SYSTEM, METHOD, APPARATUS, AND PROGRAM

REFERENCE TO RELATED APPLICATION

This application is based upon and claims the benefit of the priority of Japanese Patent Application No. 2012-252426 filed on Nov. 16, 2012, the disclosure of which is incorporated herein in its entirety by reference thereto.

The present invention relates to a network system, a method, an apparatus, and a program

BACKGROUND

The spread of high performance mobile terminals such as smart phones has brought about an increase (explosion) of traffic in a mobile communication network. It becomes necessary to increase or extend network facilities in order to cope with a shortage of network band, decrease in response, or the like due to an increase in the number of terminals using the network, increase of traffics, and so forth. For this reason, various methods of achieving cost reduction by offloading a traffic to a different network have been proposed.

In LIPA (Local IP Access), as specified in 3GPP (3rd Generation Partnership Project) specifications, for example, a traffic between a mobile terminal UE (User Equipment) and a host on a private network (e.g., a home network) such as an in-house LAN (Local Area network), an enterprise network, or the like) connected to a base station (H(e)NB) such as a femtocell or a home cell is not forwarded to a core network. Instead, the traffic is offloaded from the H(e)NB to the private network through a local gateway (L-GW) (see Section 5.2.3 in Non Patent Literature 1). The H(e)NB represents an HNB (Home Node B) or an HeNB (Home-evolved Node B).

In SIPTO (Selected IP Traffic Offload) in the 3GPP specifications, traffic associated with a specific APN (Access Point Name) or a specific application can be set to offloading target. Alternatively, offload control can be performed, based on a destination IP (Internet Protocol) address.

In SIPTO solution 4 (see Section 5.5 in Non Patent Literature 1), a configuration as illustrated in FIG. 19 is disclosed as SIPTO to be applied to UMTS (Universal Mobile Telecommunication Systems) macrocell and HNB subsystem (femtocell). As illustrated in FIG. 19, there is a provided TOF (Traffic Offload) between an RNC (Radio Network Controller)/HNB and an SGSN (Serving GPRS (General Packet Radio System) Support Node). The TOF interfaces via a Gi subset with the Internet. FIG. 19 is a diagram based on FIG. 5.5.2.1 in Non Patent Literature 1. Referring to FIG. 19, the TOF is provided on Iu-PS, and provides a standard Iu-PS interface to the RNC and the SGSN. Iu is an interface between the RNC and a core network (MSC (mobile Switching Center: mobile switching station) or the SGSN), while the Iu-PS is an interface between the RNC and a packet (Packet Switched) core network. Gi is an interface between a GGSN (Gateway GPRS Support Node) and a PDN (Packet Data Network).

The TOF on the Iu-PS performs message inspection of a NAS (Non Access Stratum: non access stratum)/RANAP (Radio Access Network Application Part) message, obtains subscriber information, and then establishes a local UE offload context. Further, the TOF obtains PDP (Packet Data Protocol) context information, and establishes a local session offload context. The TOF determines whether or not to perform offloading during attach and PDP activation procedure, for example, based on the above-mentioned information. When the offloading is performed, the TOF extracts uplink traffic from a GTP-U (GPRS Tunneling Protocol for User plane) tunnel (tunnel between a UE and the GGSN) and executes NAT (Network Address Translation) using a NAT (Network Address Translation) gateway or the like, for example, thereby offloading the traffic. For the NAT, address translation from a private IP address to a global IP address is performed by a router or the like. Alternatively, a set of the IP address and a TCP (transmission control protocol)/UDP (user datagram protocol) port number is translated. The TOF further performs reverse NAT on downlink offload traffic and returns the downlink offload traffic by inserting the downlink offload traffic to the GTP-U tunnel.

In this manner, in the SIPTO solution 4, offloading is determined, based on a user, an APN, a service type, an IP address, and so forth, using packet inspection and NAT. Data traffic is offloaded on the Iu-PS interface that is an interface (user plane) between RNC and SGSN. For LTE (Long Term Evolution), addition of a local packet data network gateway (L-PGW (PDN (Packet Data Network) Gateway)) is necessary.

SIPTO solution 5 (see Section 5.6 in Non Patent Literature 1) can accommodate a macrocell, an HNB, and both of UMTS and the LTE (and further can accommodate a UE supporting or not supporting a plurality of PDN connections). Connection to the Internet or the like is performed through an L-PGW (L-GGSN) connected to a serving gateway SGW (RNC) (see FIG. 5.6.3.2, 5.6.3.3, and 5.6.3.4 in Non Patent Literature 1). SGW may be also denoted as S-GW.

Alternatively, a traffic may be offloaded to a different network. A mobile terminal such as a smart phone, a tablet terminal, or the like equipped with a Wi-Fi (Wireless Fidelity) connection function is connected to the Internet by a Wi-Fi access point or the like, or a wireless LAN (Wireless Local Area Network) or the like (this offloading is also referred to as Wi-Fi offloading). In this case, when a mobile terminal (UE) leaves a location where the Wi-Fi access point is installed, communication connection cannot be made. That is, there is a problem with connectivity and security when the mobile terminal (UE) moves. There is also a configuration in which the wireless LAN is connected to a PDN through a PGW (PDN Gateway: also denoted as P-GW) and a GGSN (see Section 4.2 in Non Patent Literature 2).

CITATION LIST

Non Patent Literature

NPL 1: 3GPP TR 23.829, V10.0.1 (2011 October), 5.2.3, 5.5, 5.6
NPL 2: 3GPP TS 23.402, V11.4.0 (2012 September), 4.2
NPL 4: 3GPP TS 23.401, V11.3.0 (2012 September), 5.3
NPL 4: 3GPP TS 23.228, V11.6.0 (2012 September), FIG. 4.0

SUMMARY

Analysis of the related arts will be given below.

In Wi-Fi offloading or the like, mobility cannot be implemented, so that there is a problem in terms of security and so forth.

Mobility cannot be implemented by the TOF in accordance with the SIPTO solution 4 or the like.

The above-mentioned related arts do not disclose nor suggest control of traffic offloading for each flow according to the application or the like to be run on a mobile terminal, for example. Further, with respect to increase in the number of a high performance mobile terminal such as a smart phone, implementation of a method for performing traffic offloading that accommodates scalability of the mobile terminal is desired.

Accordingly, the present invention has been devised in view of the above-mentioned problems. A main object of the present invention is to provide a system, a method, an apparatus, and a program configured to reduce addition of a network facility due to an increase in traffic and to implement mobility for traffic offloading.

According to the present invention, there is provided a system comprising:

a switch arranged between a first network and a second network; and an offloading determination unit that determines whether or not to offload traffic for the first network and configures an offload path to bypass the first network for the switch when the offloading is performed, wherein when the traffic for the first network is offloaded, a packet to be offloaded is forwarded between the offload path and the second network through the switch means.

According to one aspect of the present invention, there is provided a system comprising:

an offloading unit that offloads a traffic for a first network; and an offloading determination unit that instructs the offloading unit to offload the traffic for the first network, wherein the offloading unit determines whether or not to offload a received packet, upon reception of the instruction of the offloading, and forwards the packet to an offload path configured to bypass the first network.

According to another aspect of the present invention, there is provided a method comprising:

determining whether or not to offload traffic for a first network and, when the offloading is performed, configuring an offload path for a switch arranged between the first network and a second network, the offload path being configured to bypass the first network; and forwarding a packet to be offloaded between the offload path and the second network through the switch when the traffic for the first network is offloaded.

According to a still another aspect of the present invention, there is provided a method comprising:

upon reception of an offload instruction from an offloading determination unit that determines whether or not to perform offloading, determining whether or not to offload a received packet, and when the offloading is performed, forwarding the received packet to an offload path configured to bypass the first network, by offloading traffic for the first network.

According to a yet another aspect of the present invention, there is provided a base station apparatus, wherein when offloading traffic, the base station apparatus transmits a request for configuring an offload path that bypasses a core network to a node including an offloading determination unit to determine whether or not to offload a received packet, and forwards the received packet to the offload path at a time of the offloading.

According to a different aspect of the present invention, there is provided a base station apparatus, wherein the base station apparatus receives an offload instruction from an offloading determination unit that instructs offloading of a traffic for a core network; and the base station apparatus determines whether or not to offload a received packet and forwards the packet to be offloaded to an offload path configured to bypass the core network.

According to another different aspect of the present invention, there is provided a control apparatus, wherein upon reception of a request for configuring an offload path from an offloading unit that performs offloading of a traffic for a first network, the control apparatus configures the offload path for a switch connected between the first network and a second network, the offload path being configured to connect to the second network by bypassing the first network.

According to a still another different aspect of the present invention, there is provided a control apparatus, wherein:

upon reception of a request for configuring an offload path from an offloading unit that performs offloading of a traffic for a first network, the control apparatus transmits an offload instruction to the offloading unit, and when a received packet is an offload target, the offloading unit offloads the received packet to the offload path that has been set.

According to a yet another different aspect of the present invention, there is provided a program for causing a computer comprising a base station apparatus to execute processing of:

when a packet that has arrived from a mobile terminal via a radio bearer is determined to correspond to an offload target, transmitting, to a switch arranged between a first network and a second network, a connect request with respect to an offload path configured to bypass the first network, directly or through the first network; and transmitting to the switch a disconnect request of the offload path when a predetermined command is received from a node configured to manage mobility of the mobile terminal. According to the present invention, a computer-readable recording medium (semiconductor memory or magnetic disk/optical disk) having the program stored therein is provided.

According to a further different aspect of the present invention, there is provided a program for causing a computer comprising a control apparatus configured to control a switch arranged between a first network and a second network to execute processing of:

when receiving from a base station apparatus through the switch a connect request with respect to an offload path configured to bypass the first network, configuring the switch such that a packet forwarded from the base station apparatus to the offload path is forwarded to the second network and that a packet from the second network is forwarded to a node through the offload path, and returning to the base station apparatus a connect response for the connect request of the offload path; and when receiving from the base station apparatus through the switch a disconnect request of the offload path, configuring the switch such that the gateway node of the first network is connected to the second network, and returning to the base station apparatus a disconnect response for the disconnect request of the offload path. According to the present invention, a computer-readable recording medium (semiconductor memory or magnetic disk/optical disk) having the program stored therein is provided.

According to the present invention, addition of a mobile network facility or the like due to an increase in traffic can be reduced, and mobility for traffic offloading is implemented.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION

Figure 20A:
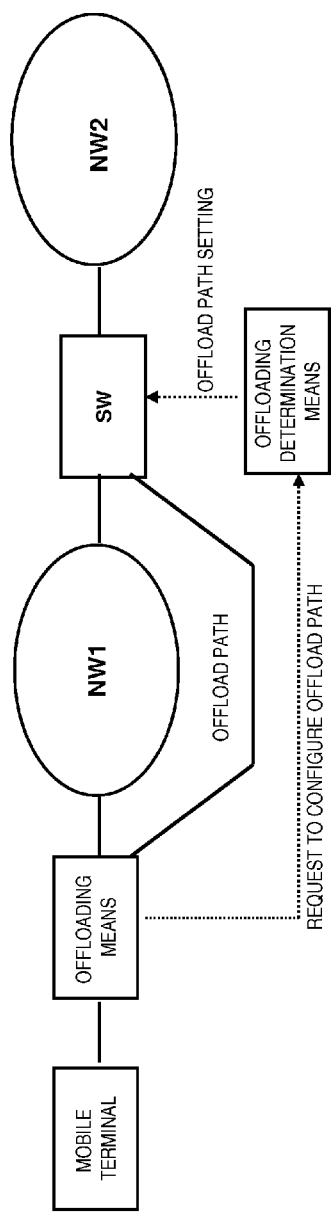
FIG. 20A is a diagram explaining the overview of the present invention.

One of preferred modes of the present invention will be described. Referring to FIG. 20A, in the preferred mode of the present invention, there are provided switch means (SW) arranged between a first network (NW1) and a second network (NW2) and offloading determination means that determines whether or not to offload traffic for the first network (NW1) and that configures an offload path to bypass the first network (NW1) for the switch means (SW) when the offloading is performed. When the traffic to the first network (NW1) is offloaded, a packet to be offloaded is forwarded between the offload path and the second network through the switch means (SW). Offloading means for offloading the traffic for the first network (NW1) forwards the packet to the offload path when the traffic is offloaded. The packet forwarded to the offload path is transmitted to the second network (NW2) through the switch means (SW).

Referring to FIG. 20A, when a traffic is offloaded to the first network (NW1), the offloading means transmits a request to configure offload path to the offloading determination means. The offloading determination means configures the offload path for the switch (SW) between the first and second networks, in response to the request to configure offload path. With this arrangement, the offloading means and the second network (NW2) are connected through the offload path and the switch means (SW), and the packet to be transmitted or received between a mobile terminal and the second network (NW2) is forwarded on the offload path configured to bypass the first network (NW1). The first network (NW1) and the second network (NW2) may be respectively set to a core network (Core Network: CN) and a packet data network (Packet Data Network: PDN). The offloading determination means and the offloading means in this exemplary embodiment may be respectively implemented in an OpenFlow controller (OFC) and a base station with offload function, for example. Alternatively, the offloading determination means may be implemented in an MME (Mobility Management Entity), an SGSN, or the like that is a node configured to manage mobility of a mobile terminal. In this case, the offloading means may be implemented in the base station with offload function, a SIPTO gateway, or the like. The present invention, as a matter of course, is not limited to a configuration in which the offloading determination means and the offloading means are implemented in separate nodes. As a variation example of the exemplary embodiment, for example, the offloading determination means and the offloading means may be combined in a single unit, and may be implemented in one network node such as a base station.

Figure 20B:
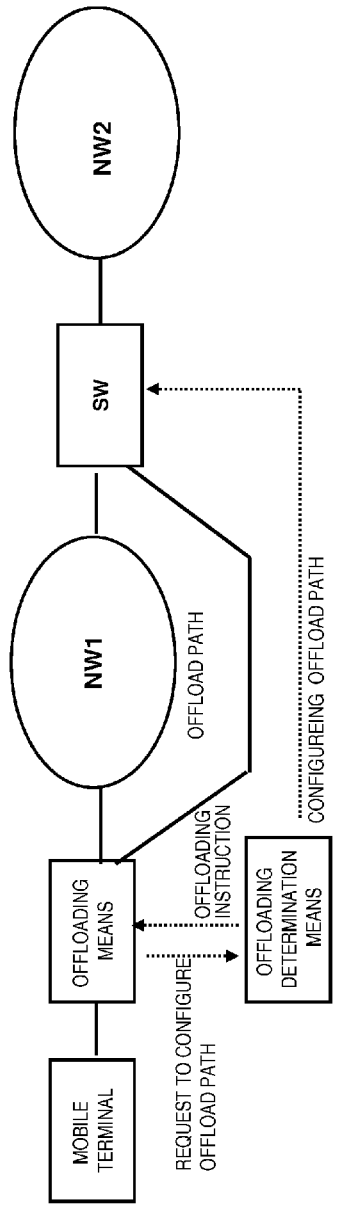
FIG. 20B is a diagram explaining an overview of the present invention.

Referring to FIG. 20B, in another preferred mode of the present invention, there is provided offloading means for offloading traffic for the first network (NW1) and offloading determination means for instructing the offloading means to offload the traffic for the first network (NW1). The offloading means receives the instruction of the offloading, determines whether or not to offload a received packet, and forwards the received packet to be offloaded to an offload path configured to bypass the first network (NW1). In the embodiment, the offloading means transmits a request to configure offload path to the offloading determination means. The offloading determination means notifies the instruction of the offloading to the offloading means. The offloading determination means configures the offload path configured to bypass the first network (NW1) in switch means (SW) between the first network (NW1) and the second network (NW2). With this arrangement, the offloading means and the second network (NW2) are connected through the offload path and the switch means (SW).

Figure 1:
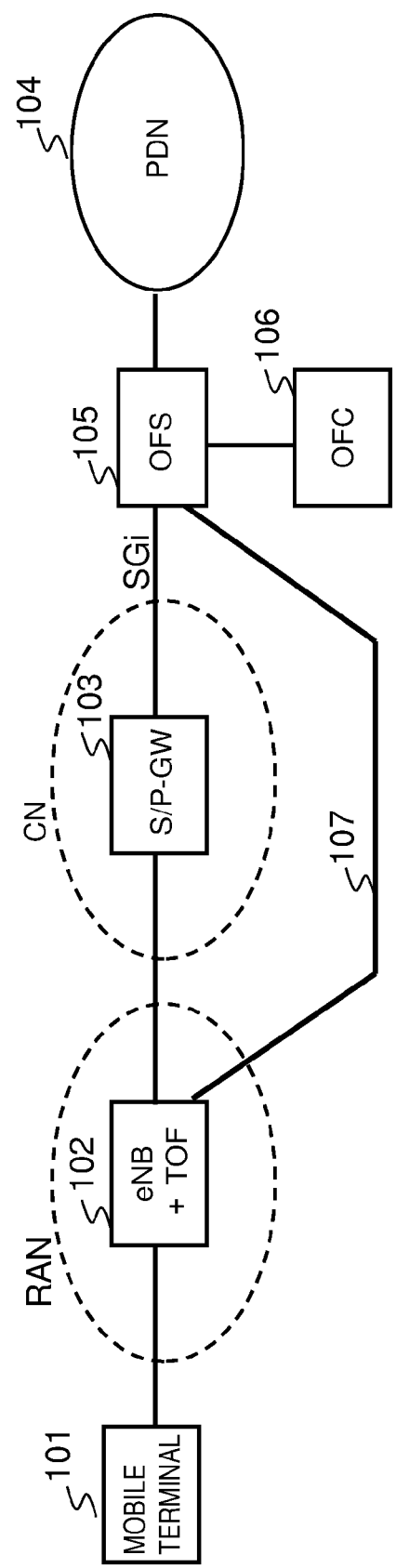
FIG. 1 is a diagram explaining an overview (one mode) of the present invention.
Figure 15:
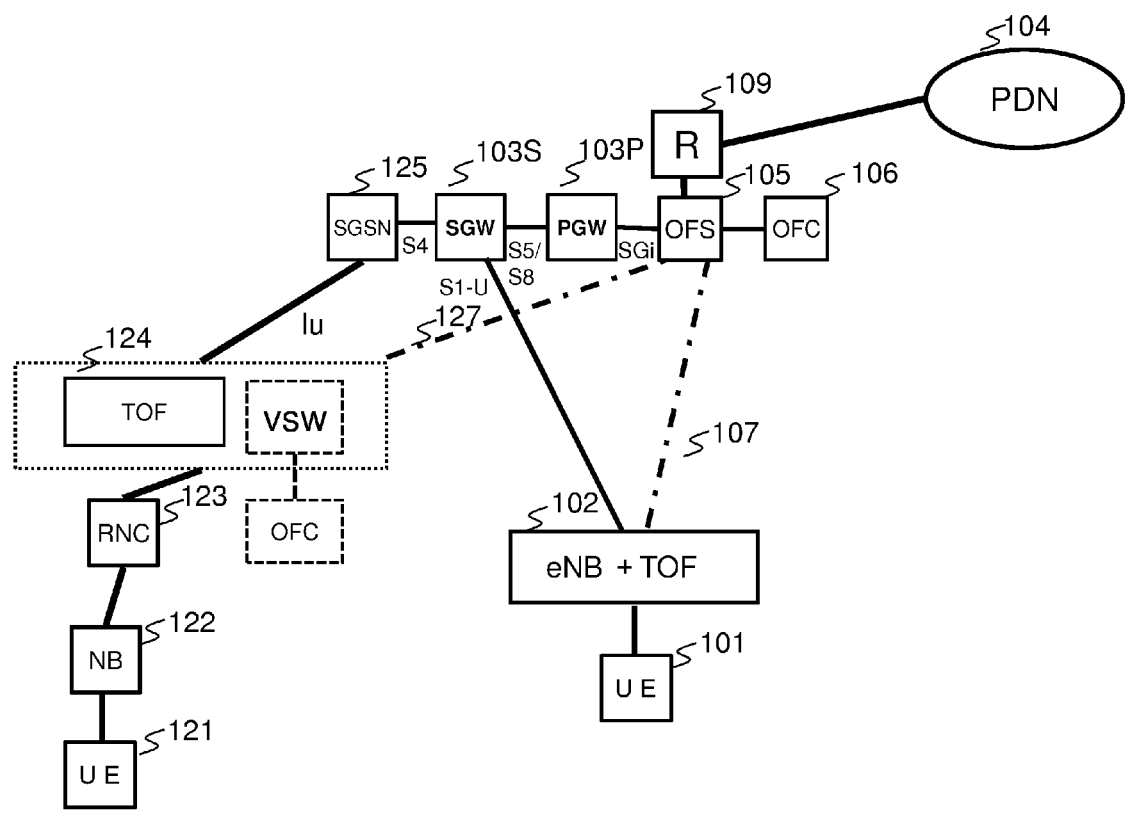
FIG. 15 is a diagram explaining another exemplary embodiment of the present invention.
Figure 16:
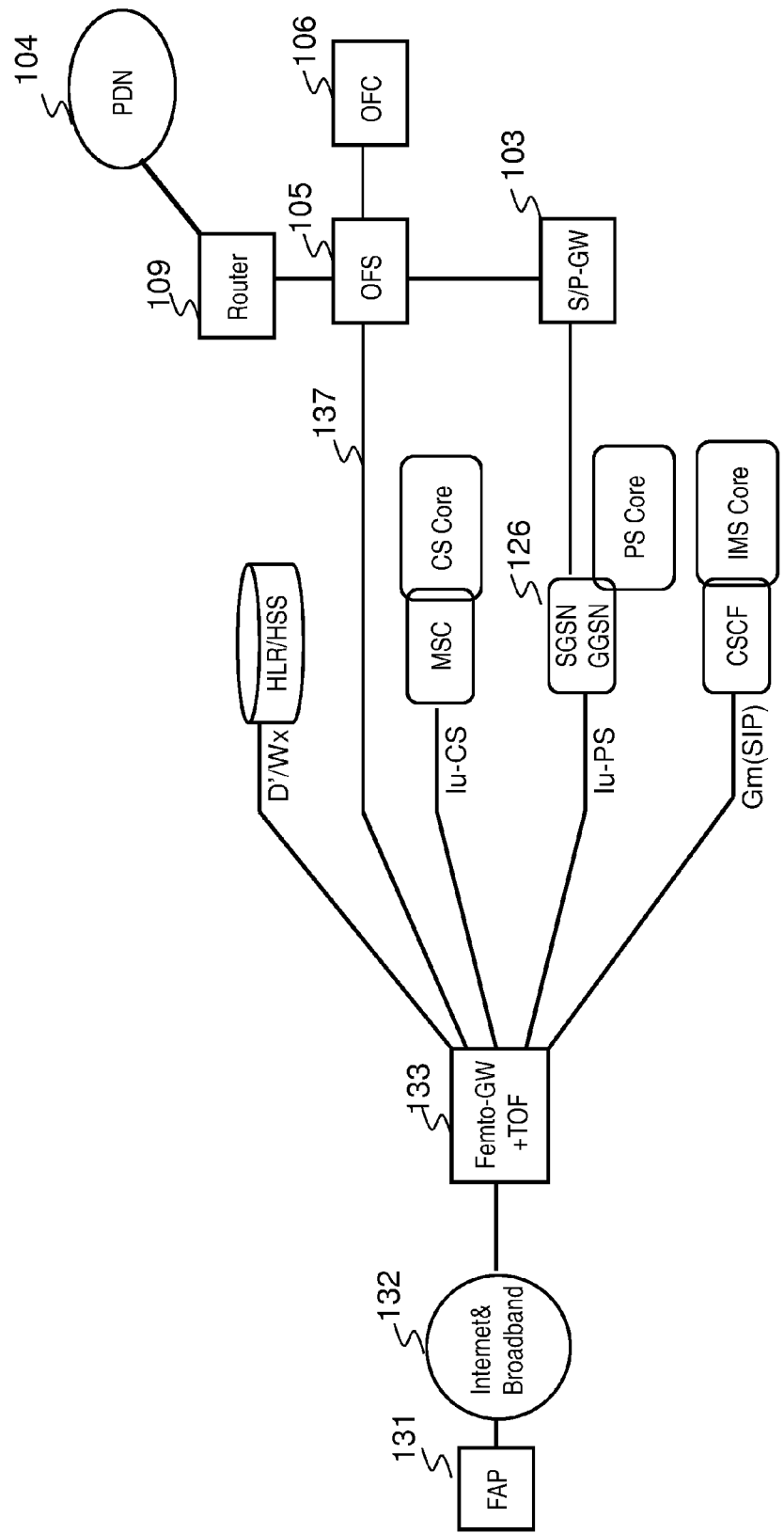
FIG. 16 is a diagram explaining a further another exemplary embodiment of the present invention.

Some exemplary embodiments of the present invention each include a node (102 in FIG. 1, 124 in FIG. 15, or 133 in FIG. 16, for example) having a function of offloading traffic to a core network (CN) and a switch (OFS) (105 in each of FIGS. 1, 15, and 16) between a gateway node (such as a PGW (PDN Gateway) of an S/P-GW (SGW/PGW) 103 in each of FIGS. 1 and 16 or a PGW 103P in FIG. 15) and an external packet data network (a PDN 104 in each of FIGS. 1, 15, and 16). When the traffic is offloaded, the switch (OFS) connects the node (102 in FIG. 1, 124 in FIG. 15, and 133 in FIG. 16, for example) to the external packet data network (104 in each of FIGS. 1, 15, and 16) through an offload path (107 in FIG. 1, 107, 127 in FIG. 15, and 137 in FIG. 16) for bypassing the core network. When the offloading is not performed, the node (102 in FIG. 1, 124 in FIG. 15, and 133 in FIG. 16, for example) connects to the core network (CN), and the switch connects the gateway node (PGW in the S/P-GW 103 in each of FIGS. 1 and 16 or PGW 103P in FIG. 15) to the external packet data network (PDN 104 in each of FIGS. 1, 15, and 16). The some exemplary embodiments provide means for implementing an inter base station handover between base stations with offload functions and further implementing an inter base station handover using a base station with offload function as a mobile source/mobile destination and a base station without offload function as a mobile destination/mobile source. Herein, a packet corresponds to a data sequence unit, and includes both a packet for layer 3 (network layer), and a frame in the case of layer 2 (data link layer).

First Exemplary Embodiment

An exemplary embodiment of the present invention will be described with reference to the drawings. FIG. 1 corresponds to the mode described with reference to FIG. 20A, and the first and second networks are respectively set to a core network and a PDN (Packet Data Network). According to this exemplary embodiment, at a reference point (RP: Reference Point) SGi (for 2G/3G (second generation/third generation)) between a PDN (Packet Data Network) 104 and a PGW, a switch (OFS) 105 is arranged at a location corresponding to a reference point Gi between the PDN and a GGSN. When traffic offloading (TOF) is performed, uplink data traffic from a mobile terminal 101 is offloaded at a traffic offload node of a radio access network (RAN: Radio Access Network), and is forwarded to the PDN 104 through the switch 105 by bypassing the core network (CN: e.g., LTE/EPC (Long Term Evolution/Evolved Packet Core) network). The traffic offload node of the radio access network (RAN) is an eNB (evolved Node B) (102 in FIG. 1) with offload function, for example, in the case of an E-UTRAN (Evolved Universal Terrestrial Random Access Network), and is the above-mentioned TOF (124 in FIG. 15) on the Iu-PS, for example, in the case of a UTRAN (Universal Terrestrial Random Access Network). Downlink traffic from the PDN 104 is forwarded from the switch 105 to the traffic offload node of the radio access network (RAN) by bypassing the core network (CN) and is then radio-transmitted to the mobile terminal 101. When the offloading is not performed, uplink data traffic from the mobile terminal 101 is forwarded to the PDN 104 through the radio access network (RAN), the core network (CN), and the switch 105. Downlink traffic from the PDN 104 is transmitted from the switch 105 to the mobile terminal 101 through the core network (CN) and the radio access network (RAN).

The switch 105 in the exemplary embodiment of the present invention is constituted from an OpenFlow switch (OFS). Further, an openflow controller 106 configured to control the OpenFlow switch (OFS) is included. The Openflow controller 106 performs setting of a flow at a time of traffic offloading in a flow table of the OpenFlow switch (OFS). With respect to the flow used for setting in the flow table of the OpenFlow switch, a path (through the PGW) at a time of non-offloading may be set to have a default value.

<OpenFlow>

The following outlines Open Flow. OpenFlow is a network control technology proposed by an OpenFlow switch consortium. In OpenFlow, a series of communications determined by a combination of identifiers such as a physical port number (L1), a MAC (Media Access Control) address (L2), an IP address (L3), a port number (L4) and so forth, is defined as a "flow". Path control is implemented for each flow. An OpenFlow Switch (abbreviated as an OFS) configured to function as a forwarding node operates according to a flow table to which addition and rewriting is instructed from an OpenFlow Controller (abbreviated as an OFC). The flow table includes, for each flow, a rule (that is a filtering condition to be matched against header information of a packet), statistical information (that can be specified as counters. The statistical information includes flow statistical information such as the number of packets, the number of bytes, and an active period of the flow), and an action (such as flow processing, packet forwarding (Forward), drop (Drop), and modification (Modify-Field) of a packet specific field) that defines processing to be applied to a packet matching the rule. As packet forwarding (Forward), one of the following processing is selected, for example:
  forwarding to a specific port of the switch;
  forwarding to all ports of the switch; and
  forwarding to OFC.

Upon receipt of a packet, an OFS searches a flow table in the OFS, and performs matching (matching) between the header information of the packet and the rule. As a header field to be matched, an arbitrary combination of layer 1 (L1), the layer 2 (L2), the layer 3 (L3), and layer 4 (L4) can be used. The followings are an example of the layers 1 (L1) to 4 (L4):
L1: Ingress Port (physical port number of the switch)
L2: Ether src (transmission source MAC address), Ether dst (destination MAC address), Ether type, (Virtual Local Area Network)—id, VLAN priority;
L3: IP src (transmission source IP address), IP dst (destination IP address), IP protocol type, TOS (Type Of Service) value;
L4: TCP (Transmission Control Protocol)/UDP (User Datagram Protocol) src port (transmission source L4 port number), TCP/UDP dst port (destination L4 port number)

When the header information of the received packet matches the rule (condition) of a certain flow entry, the processing (processing to be executed on the packet when the rule matches the header information of the received packet) defined in the action (in the action field of the flow entry) corresponding to the rule is executed. When the flow entry having the rule that matches the header information of the received packet is not found as a result of search of the flow table, the OFS forwards the received packet to the OFC, using a secure channel. The OFC performs path calculation, determines the forwarding path of the received packet, and performs setting of the flow table for implementing the determined forwarding path for each OFS on the forwarding path (flow setup), based on information on a transmission source and a transmission destination of the received packet. The OFC that has performed the flow setup forwards the received packet to the OFS that serves as the exit of the flow to be transmitted to the transmission destination through the OFS that serves as the exit of the flow, for example. Thereafter, header information of a packet belonging to the same flow as that of the received packet matches the rule in the flow table of the OFS for which the flow setup has been performed. Then, the packet is forwarded to each OFS on the forwarding path of the packet according to the flow table (that defines the rule and the action) that has been set, and is then transmitted to a transmission destination terminal. A packet that does not match the rule in the flow table as a result of search of the flow table by the OFS is often a packet to be forwarded at the beginning of a certain flow. Such a packet is also collectively referred to as a "first packet".

Figure 2:
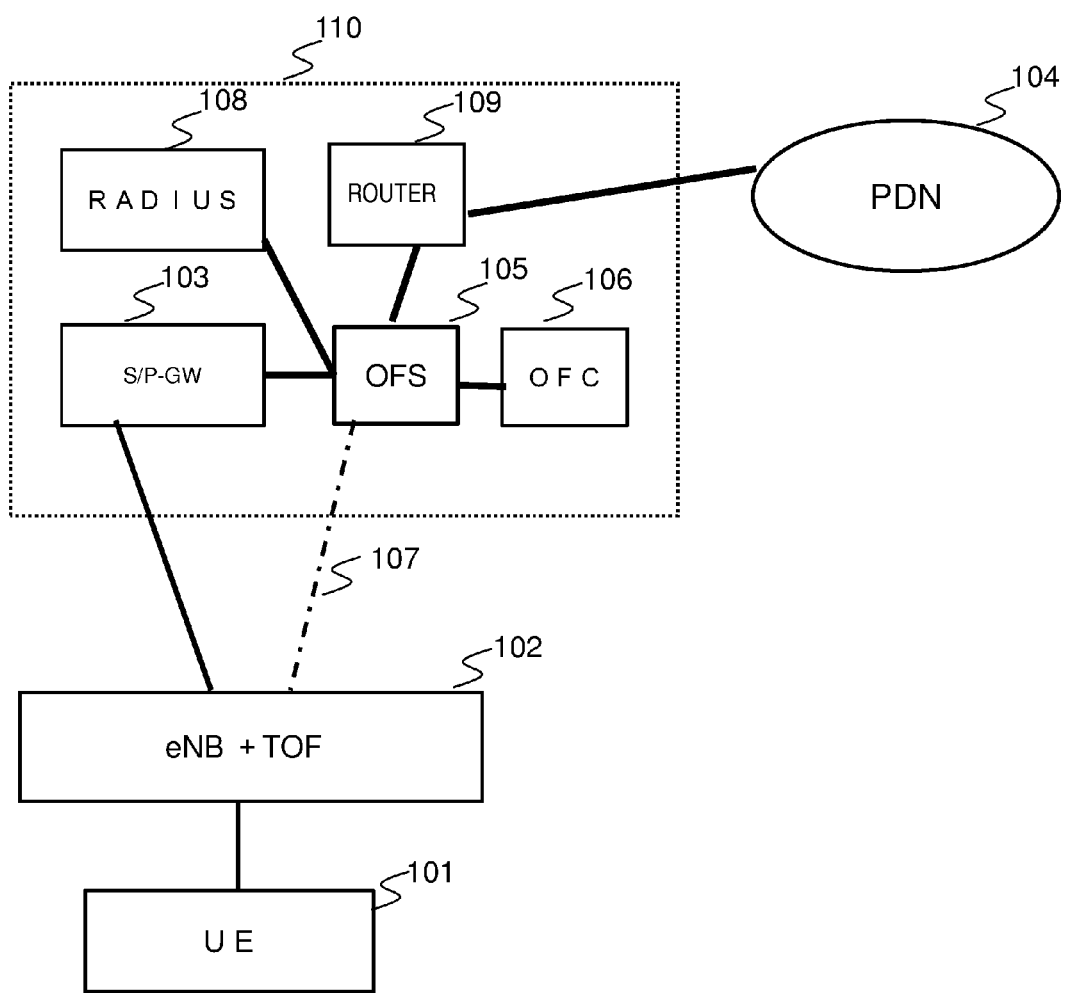
FIG. 2 is a diagram explaining one exemplary embodiment of the present invention.

FIG. 2 is a diagram illustrating one exemplary embodiment of the present invention. The one exemplary embodiment includes a mobile terminal (UE) (User Equipment) 101, a base station eNB (eNode B) connected to the UE 101 in a service area through a wireless link (the base station eNB with offload function and having a traffic offload function is also abbreviated as an "eNB+TOF"), and a station 110. The station 110 includes an S/P-GW 103, an OFS 105, an OFC 106, a RADIUS (Remote Authentication Dial In User Service) server 108 configured to function as an AAA server that controls authentication (Authentication), authorization (Authorization), and accounting (Accounting), and a router 109 configured to perform relay control on the layer 3. The router 109 is connected to a PDN 104. The router 109 terminates a MAC address when performing relaying, and a MAC frame to be transmitted by the router has a port MAC address of the router 109. Referring to FIG. 2, an MME (Mobility Management Entity), an HSS (Home Subscriber Server), a PCRF (Policy and Charging Rules Function), and so on are omitted. Though no particular limitation is imposed, referring to FIG. 2, a layer 2 switch (L2SW) may be arranged at a local station (between the base station with offload function (eNB+TOF) 102 and the station 110) on a hierarchy immediately below that of the station 110. For simplification, one PGW is connected to the OFS 105 in the vicinity of the router 109 in FIG. 2. However, a configuration where a plurality of the PGWs are connected to the OFS that functions as a layer 2 switch may be used to form a scalable system configuration (operable to perform system extension/reduction, corresponding to an increase/reduction of the number of subscribers or a load increase/decrease), or a redundant configuration may be used. By employing the OFS, improvement in network scalability is facilitated.

In response to a notification from the base station with offload function (eNB+TOF) 102, the OFC 106 adds an offload path 107 (path 107 between the base station eNB+TOF 102 and the OFS 105 in FIG. 2) for each UE 101, and configures the offload path 107 in the OFS 105. When offloading is performed, the OFS 105 forwards an uplink packet offloaded at the base station with offload function (eNB+TOF) 102 to the router 109 to be transmitted to the PDN 104, and forwards a downlink packet forwarded from the PDN 104 through the router 109 to the base station with offload function (eNB+TOF) 102, according to the flow table (including the rule and action set for each flow) set up by the OFC 106. When offloading is not performed, the OFS 105 forwards an uplink packet forwarded to the SIP-GW 103 from the base station with offload function (eNB+TOF) 102 to the router 109 to be transmitted to the PDN 104, and forwards a downlink packet forwarded from the PDN 104 through the router 109 to the base station with offload function (eNB+TOF) 102 through the S/P-GW 103. Referring to FIG. 2, the RADIUS server is connected to the PGW to perform authentication, for example. However, the RADIUS server is also connected to the OFS 105. This schematically indicates that the OFS 105 hooks a packet forwarded between the PGW and the RADIUS server to forward the packet to the OFC 106, as will be described later. Further, just for simplification, each of FIGS. 1 and 2 illustrates the configuration where an SGW (Serving Gateway) and the PGW are integrally accommodated. However, as a matter of course, the SGW and the PGW may be arranged separately to each other.

According to this exemplary embodiment, network selection for Web browsing, mail acquisition, Tweeting, settlement of accounts, moving picture browsing, or the like by the mobile terminal (UE) 101 is made to be possible, according to each application, for example. The OFC 106 selects a communication network for each flow, thereby allowing use of an optimal communication network when the UE 101 receives a communication service or the like.

Figure 3:
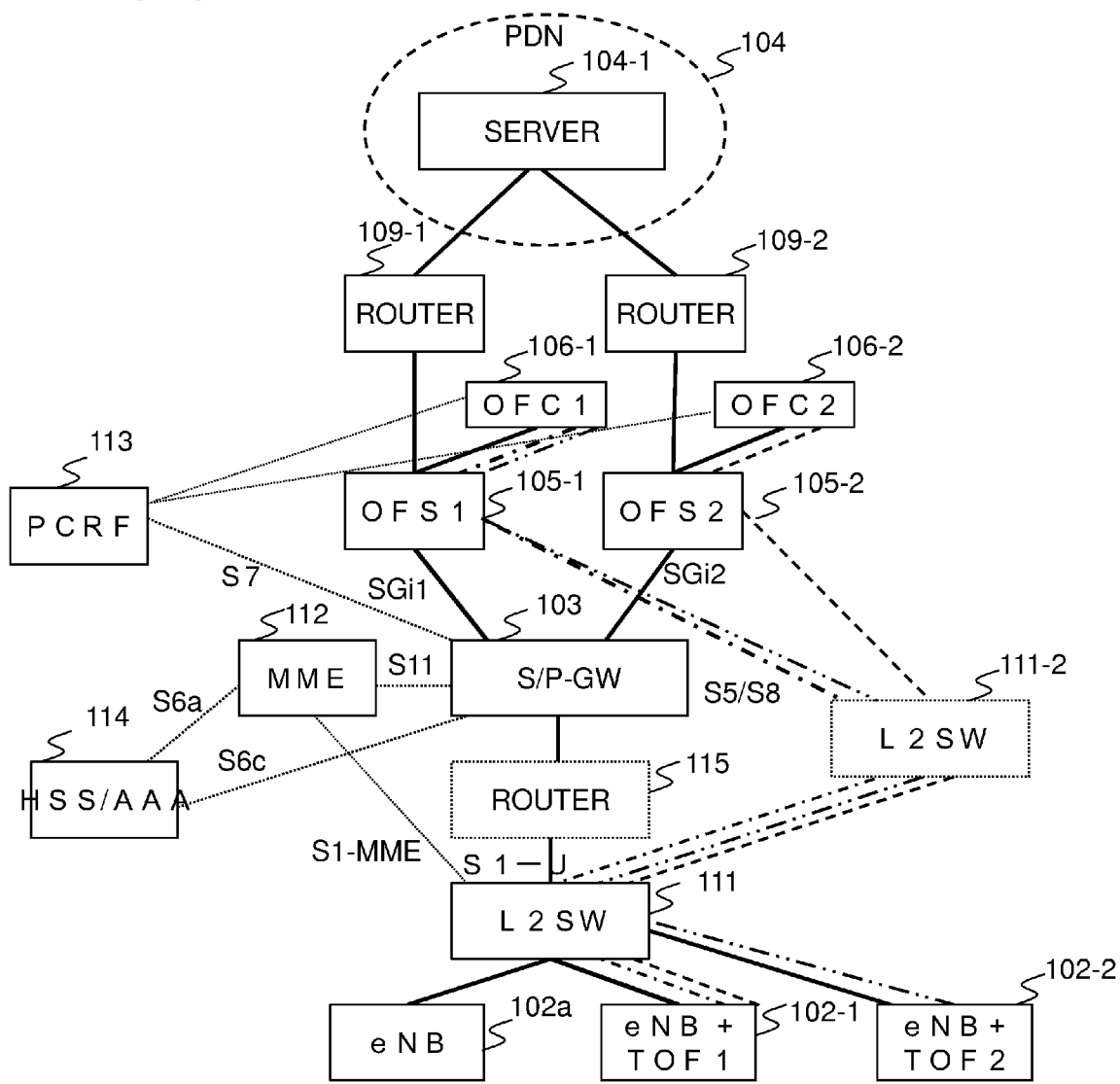
FIG. 3 is a diagram explaining one exemplary embodiment of the present invention.

Though not limited thereto, a description will be given about an application example where the radio access network (RAN) is set to an E-UTRAN and the core network (CN) is set to an EPC/LTE network. FIG. 3 is a diagram illustrating an example using the configuration in each of FIGS. 1 and 2. Referring to FIG. 3, a same reference sign is assigned to an element that is the same as that in each of FIGS. 1 and 2. Each element will be outlined below. An eNB 102a is connected to an SGW via an S1-U interface, and is connected to an MME via an S1-MME interface.

Base stations 102-1 and 102-2 are base stations each obtained by causing the above-mentioned eNB 102a to include a traffic offloading (TOF) function according to the present invention, and are denoted as eNBs+TOFs, as described before.

The SGW (Serving Gateway) of the S/P-GW 103 forwards a user data packet by routing and at the same time functions as a user-plane mobility anchor during inter-eNB handover. The SGW functions as a mobility anchor between the LTE and a different 3GPP technology (terminating an S4 interface and relaying traffic between a 2G/3G system and the PGW, for example). For idle state UEs, the SGW terminates the downlink data path and triggers paging when downlink data arrives for the UE. The SGW manages and stores UE contexts (e.g. parameters of the IP bearer service and network internal routing information).

An MME (Mobility Management Entity) 112 functions as a mobility management node of each mobile terminal (UE) in an LTE access network, and performs tracking and paging of the mobile terminal (UE) in an idle mode, bearer activation/inactivation, selection of the SGW and the PGW at an initial attach point, management of tunnel establishment between the SGW and the PGW, selection of the SGW for the mobile terminal (UE) at a time of a handover in the LTE, and user authentication along with an HISS, and so on. The MME is connected to each base station (eNB) via the S1-MME interface to which an S1-AP (application) protocol for message exchange is applied. Further, the MME 112 is connected to the SGW via an S11 interface.

The PGW (PDN Gateway) of the S/P-GW 103 implements connection of each mobile terminal (UE) to the PDN located outside. The mobile terminal (UE) can simultaneously have two or more connectivities for accessing a plurality of the PDNs. The PGW executes IP address allocation (dispensing), policy application, and packet filtering (such as deep packet inspection or packet screening), for example, for the mobile terminal (UE) that has attached to the PGW in order to map traffic to an appropriate QoS (Quality of Service) level. FIG. 3 discloses a configuration in which the SGW and the PGW are integrally provided. However, as a matter of course, the SGW and the PGW may be arranged separately to each other. When the PGW and the SGW are located at a same PLMN (Public Land Mobile Network), the PGW is connected to the SGW via an S5 interface. When the SOW is located at a PLMN located outside (in a service area), the PGW is connected to the SGW via an S8 interface.

A PCRF (Policy and Charging Rules Function) 113 controls a policy and a charging rule. The PCRF 113 is connected to the PGW via an S7 interface.

An HSS (Home Subscriber Server)/AAA (Authentication, Authorization and Accounting) 114 performs management and authentication of subscriber information. An HSS server and an AAA server may be arranged separately to each other. The AAA server in FIG. 3 may be the RADIUS server 108 in FIG. 2. The AAA server is indicated by RADIUS in operation explanatory diagrams after FIG. 5.

In the configuration example illustrated in FIG. 3, two sets of interfaces SGi1 and SGi2 are provided as interfaces SGi between the PGW and the PDN, and OFSs 1 and 2 are arranged, corresponding to the interfaces SGi1 and SGi2, respectively. Further, an OFC1 and an OFC2 that are respectively connected to the OFS 1 and OFS 2 and respectively control the OFS1 and the OFS2 are provided. The OFS1 and the OFS2 are respectively connected to the PDN 104 through routers 109-1 and 109-2. A server 104-1 of the PDN 104 may be a Web server or the like, or a test server or the like configured to test connectivity of an OpenFlow-based traffic offload function and perform various settings.

Referring to FIG. 3, paths connected between eNB 102-1 and 102-2 and the OFSs 1 and 2 through layer 2 switches (L2SW) 111 and 111-2 (broken lines connected to the eNBs 102-1 and 102-2 are respectively illustrated by a one-dotted line and a two-dotted line) indicate offload paths configured to bypass the S/P-GW 103. The OFC 1 is connected to the PCRF 113, and notifies a count of a packet that has been subject to offloading processing, in the form of charging information. The OFC 2 also performs similar processing. VLANs (Virtual LANs) (illustrated by the one-dot line, the two-dot line, or the broken line in FIG. 3) may be added to paths from the OFCs to the base stations (eNB+TOF) through the OFSs and an MBH (mobile Back Haul: configured to connect each base station and the core network), for the respective interfaces SGi via which the OFS are installed. The VLAN to be connected to the same interface SGi may be thereby distinguished. Assume that an IP address space different for each VLAN is allocated, for example. In this case, each base station has a plurality of IP addresses. When the IP address space allocated to the VLAN illustrated by the one-dot line is 192.168.0.0/22, the IP address space allocated to the VLAN illustrated by the broken line is 192.168.4.0/22, the IP address space allocated to the VLAN illustrated by the two-dot line is 192.168.8.0/22, for example, IP addresses 192.168.0.10 and 192.168.4.10 are assigned to the eNB 102-1, for example.

A router 115 between the layer 2 switch (L2SW) 111 and the S/P-GW 103 in FIG. 3 may be omitted. The router 115 performs routing of a base station group connected to the layer 2 switch (L2SW) 111 to a different S/P-GW not illustrated. The layer 2 switch (L2SW) 111-2 may be removed. Referring to FIG. 3, the OFC1, the OFS1, the OFC2, and the OFS2 have a same IP address. The SGi1 and the SGi2 are respectively connected to the OFS1 and OFS2. When there is no address duplication, a plurality of the PGWs may be configured to be connected to one OFS. For simplicity, one OFS is illustrated to be connected to the OFC. However, as a matter of course, a plurality of the OFSs may be configured to be connected to the same OFC. Each of the layer 2 switches (L2SW) 111 and 111-2 may be constituted from the OFS.

Next, operation of the exemplary embodiment described with reference to FIG. 3 will be described with reference to each of FIGS. 4 and 14. In the LTE, as connection states between a mobile terminal (UE) and a base station (eNB), there are an RRC (Radio Resource Control) idle (RRC idle) state and a connected (RRC connected) state. As connection states between the UE and a core network (MME), there are an ECM (EPS (Evolved Packet System) Connection Management) idle (ECM Idle) state and an ECM connected (ECM Connected) state. As a UE address, a private IP address is used due to IPv4 IP address depletion. The same base station does not connect to EPCs having overlapping private address spaces (private addresses do not overlap each other).

Figure 4:
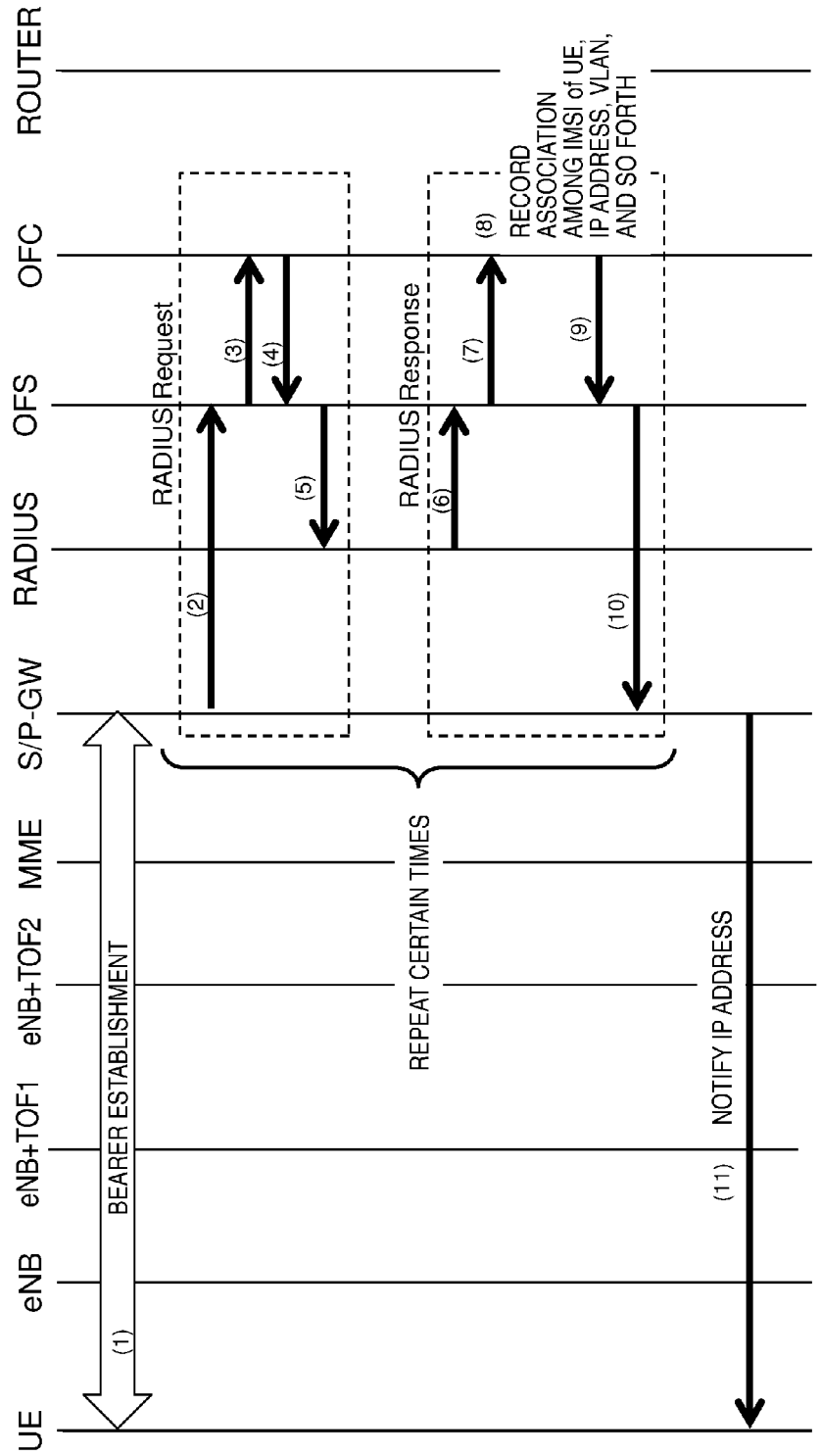
FIG. 4 is a diagram explaining an operation example of the one exemplary embodiment of the present invention.

FIG. 4 is a diagram explaining an operation procedure (sequence) when the UE (101 in FIG. 2) performs network registration processing (attach processing). Referring to FIG. 4, eNB corresponds to the eNB 102a in FIG. 3, and eNB+TOF1 and eNB+TOF2 respectively correspond to the base station with offload function (eNB+TOF1) 102-1 and the base station with offload function (eNB+TOF2) 102-2. RADIUS corresponds to the RADIUS server 108 in FIG. 2, and router (Router) corresponds to the router 109 in FIG. 2, the router 109-1, or the router 109-2 in FIG. 3. The same applies in each of FIGS. 5 to 14.

Bearer establishment is performed between the UE and the S/P-GW in response to a bearer establishment request (attach request) (in step (1)). In bearer establishment processing in step (1), the UE transmits an attach request message to the MME. The MME performs user authentication, based on authentication information obtained from the HSS that has registered subscriber information, selects the SGW and the PGW, based on an APN (Access Point Name) notified by the UE using the attach request message, and transmits a bearer setup request to the selected SGW and PGW. The PGW performs IP address dispensing, and further sets a bearer between the SGW and the PGW. The SGW returns a bearer setup response to the MME. The MME transmits a context setup request to the eNB, and sets a wireless bearer between the UE and the eNB. The UE transmits an attach completion response to the MME. The eNB returns a context setup Response to the MME. The MME transmits to the SGW a bearer update request, based on the context setup response, and the SGW returns a bearer update response to the MME.

As illustrated in FIG. 4, the OFC (106 in FIG. 2) functions as a relay node of the RADIUS server (108 in FIG. 2) configured to perform authentication. That is, the OFS (105 in FIG. 2) hooks a request packet forwarded from an access point (such as the PGW) that is a RADIUS client to the RADIUS server (in step (2)). At that point, the OFS (105 in FIG. 2) receives the request packet forwarded to the RADIUS server by filtering, for example. The request packet is originally the packet addressed to the RADIUS server, for the OFS (105 in FIG. 2), and header information of the packet does not match the rule of the flow table of the OFS. Thus, the request packet is forwarded to the OFC using a secure channel, as a "first packet", for example (in step (3)). The request packet is forwarded from the OFC to the RADIUS server through the OFS again (in steps 4 and 5). Alternatively, the flow table may be so set that the request packet is forwarded to the OFC from the OFS (in this case, the secure channel is not used).

The RADIUS request packet transmitted from the PGW that is the RADIUS client to the RADIUS server via a (UDP (User Datagram Protocol)) includes a user name, an encryption password, a client IP address, and a port ID, for example. The RADIUS server checks a user database matching a log-in request upon reception of an authentication request. The RADIUS server requests connection of the user, performs authentication of the user, and returns necessary setting information or the like, as a response.

A response packet from the RADIUS server to the PGW is also hooked by the OFC (in step (6)), and is forwarded to the OFC (106 in FIG. 2) (in step (7)). The OFC (106 in FIG. 2) performs packet inspection, and records a correspondence relationship among a terminal ID (IMSI (International Mobile Subscriber Identity)), an IP address, and a VLAN (Virtual Local Area Network) (in step (8)). In VLANs, connection node grouping is performed on the basis of a port (the grouping is performed for each port of a layer 2 switch), on the basis of a MAC address (the VLAN is determined for each MAC address), or on the basis of a protocol.

The response packet from the RADIUS server is forwarded to the PGW through the OFC (106 in FIG. 2) and the OFS (105 in FIG. 2) (in steps 9 and 10). Arrogation and falsification are prevented between the RADIUS server and the RADIUS client (PGW), using a common key method. For this reason, the OFC holds key information common to the RADIUS server. When the RADIUS server is arranged as the AAA server, the PGW is connected to the RADIUS server via an S6c interface, for example.

Then, the PGW performs IP address dispensing, and notifies the IP address to the UE (in step (11)).

<Offload Path Addition>

Figure 5:
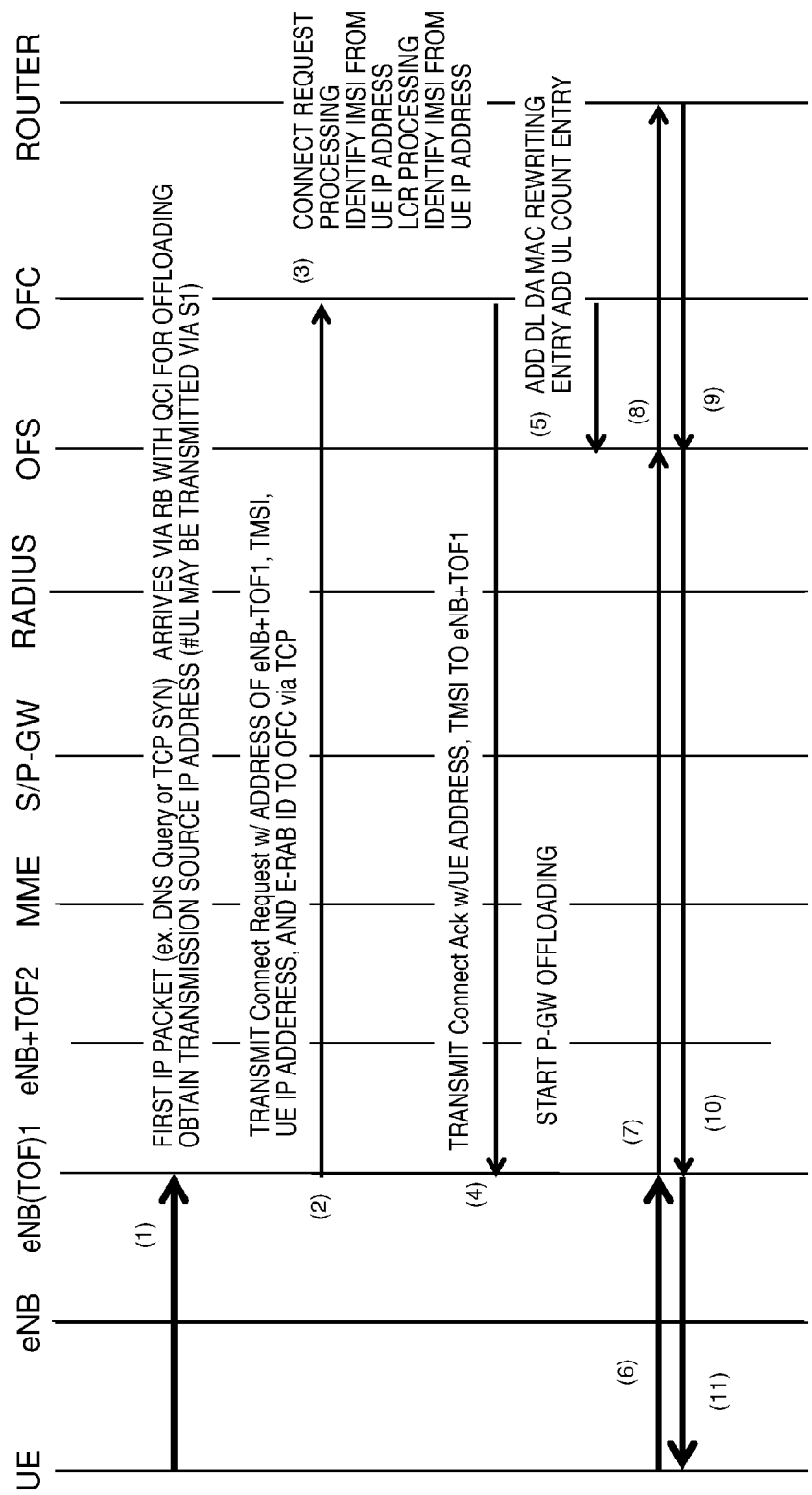
FIG. 5 is a diagram explaining an operation example of the one exemplary embodiment of the present invention.

FIG. 5 is a diagram describing an operation (of addition of an offload path) when the UE starts communication under control of the base station with offload function (eNB+TOF). It is assumed that private addresses of the OFSs (OFCs) connected to the different SGis do not overlap (which is a case where the same base station does not connect to EPCs having overlapping private address spaces, for example).

The UE starts communication under control of the eNB+TOF1. A QCI (QOS (Quality of Service) Class Identifier) targeted for offloading is set in each of the eNB+TOF1 and the eNB+TOF2 in advance. An IP address (private IP address) for the OFC is set in each of the eNB+TOF1 and the eNB+TOF2.

The QCIs used in VoLTE (Voice Over LTE) (defined in IR.92 specifications) will be listed below:
voice bearer (GBR (Guaranteed Bit Rate)): QCI=1
video bearer (GBR): QCI=2
video bearer (nonGBR): QCI=7
default bearer for SIP (Session Initiation Protocol) signal that is a control signal in VoLTE: QCI=5
Internet Connectivity: QCI=8 or 9

A radio bearer having the QCI=8, 9, for example, is set to be a target for offloading determination in eNB+TOF.

The eNB+TOF1 receives a packet from the UE (in step (1)). When receiving, via the radio bearer with the QCI targeted for offloading, the packet that is a first IP packet (such as a DNS (Domain Name Service) Query packet (indicating a query to a DNS server) or a TCP SYN packet (packet to be forwarded to a server from a client when a TCP connection is established), the eNB+TOF1 obtains the transmission source IP address. The uplink packet may be transmitted via an S1.

The eNB+TOF1 transmits to the OFC a connection request (Connection Request) via the UDP (User datagram Protocol) (in step (2)). The Connection Request includes the address of the eNB+TOF1, a TMSI (Temporary Mobile Subscriber Identity), the IP address of the UE, and an E-UTRAN radio bearer identifier E-RABID (Radio Access Bearer ID), for example. The address of the UE is set to a private address in view of the IPv4 address depletion. The connection request (Connection Request) is directly forwarded to the OFS from the eNB+TOF1, and the Connection Request from the OFS to the OFC is forwarded as a "Packet IN" using the secure channel. Alternatively, the packet of the connection request (Connection Request) may be forwarded to the OFC, according to the setting of the rule in the flow table of the OFS by the OFC (in this case, the OFS forwards the connection request to the OFC according to the flow rather than in the form of the "Packet IN" for each event).

The OFC performs processing on the connection request (Connection Request) with the eNB+TOF1 (performs setup in the flow table of the OFS), and then the OFC identifies an IMSI (International Mobile Subscriber Identify) from the IP address of the UE (in step (3)).

The OFC sends a connection response (Connection ACK) to the eNB+TOF1 (in step (4)). The connection response (Connection ACK) includes the TMSI and the IP address of the UE.

The OFC sets a MAC rewriting entry in the destination address of the header of the packet in the flow table of the OFS, for a downlink (DL) packet. The OFC adds a counter entry for each of an uplink and a downlink to the flow entry of the flow table of the OFS (in step (5)). Charging information is collected for each of uplink and downlink packets to be offloaded.

Traffic offloading is started. The UE transmits a data packet to the eNB+TOF1 (in step (6)). When the packet from the UE is a packet via the radio bearer with the QCI targeted for offloading, the eNB+TOF1 forwards the packet to the OFS (in step (7)). A packet not to be offloaded is forwarded to the SGW of the S/P-GW and is then forwarded from the PGW to the router through the OFS. The OFS transmits the forwarded packet from the router (Router) to the PDN (in step (8)). Determination about offloading may also be made, based on the QCI of the packet.

A packet received from the PDN through the router (Router) is forwarded to the OFS (in step (9)). The packet addressed to the UE is forwarded from the OFS to the eNB+TOF1 (in step (10)), and is radio-transmitted from the eNB+TOF1 to the UE (in step (11)).

<Offload Path Addition 2>

Figure 6:
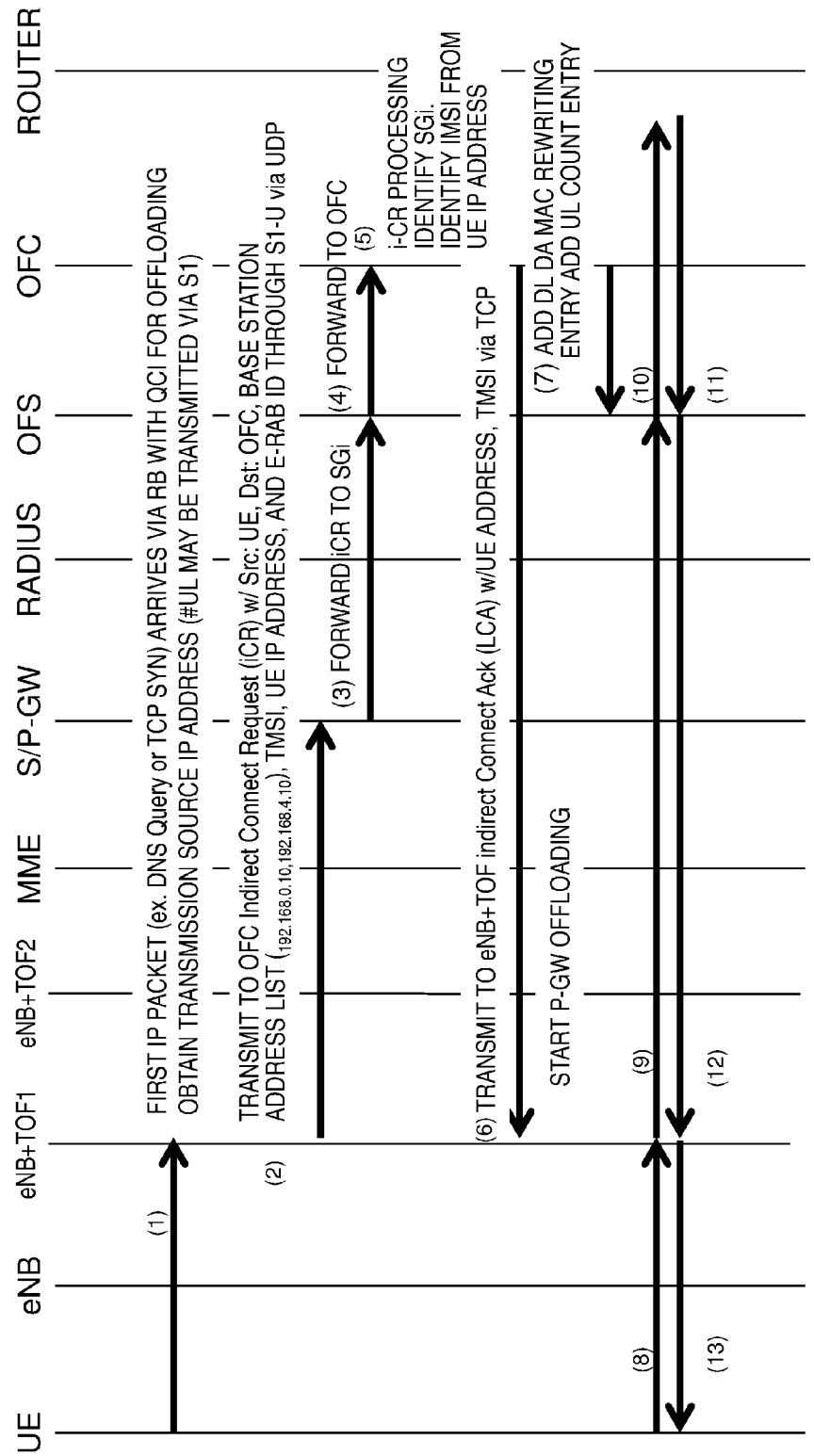
FIG. 6 is a diagram explaining an operation example of the one exemplary embodiment of the present invention.

FIG. 6 is a diagram illustrating a sequence that may be applied to a region in which private addresses overlap, for addition of an offload path when the UE starts communication under control of the eNB+TOF. In this case, the base station connects to the EPCs having overlapping private address spaces. To take an example, private IP addresses of the OFSs and the OFCs connected to the different SGis overlap. In this case, the eNB+TOF transmits an indirect connect request (indirect Connect Request) (abbreviated as an iCR) to the OFC, and identifies the offload path using a response transmitted from the OFC. This operation corresponds to "Return Routability" proposed by Mobile IPv6, configured to check reachability at the HOA (Home of Address) and the COA (Care-Of-Address).

The QCI targeted for offloading and an IP address (private IP address) addressed to the OFC are set in each of the eNB+TOF1 and the eNB+TOF2 in advance.

The UE starts communication under control of the eNB+TOF1. The eNB+TOF1 receives a packet via the UE (in step (1)). Upon receipt of the packet transmitted first via the radio bearer with the QCI targeted for offloading (such as a DNS Query packet or a TCP SYN packet), the eNB+TOF1 obtains the transmission source IP address.

The eNB+TOF1 transmits an indirect Connect Request (iCR) for the OFC to the SGW through the S1-U by the UDP (User Datagram Protocol) (in step (2)). With respect to a PMIP (Proxy Mobile IP) in 3GPP/2 or WiMAX (Worldwide Interoperability for Microwave Access) as well, an agent operates similarly. The indirect connect request (indirect Connect Request) includes the transmission source UE, the OFC of the destination, a base station address list (including IP addresses of 192.168.0.10 and 192.168.4.10 assigned to the eNB+TOF1), the TMSI, the IP address of the UE, and an E-RAB ID.

The PGW outputs the indirect connect request (iCR) to the SGi (SGi 1 or SGi 2) to be forwarded to the OFS (OFS 1 or OFS 2) (in step (3)). The OFS (OFS 1 or OFS 2) forwards the indirect connect request (iCR) from the PGW to the OFC (OFC 1 or OFC 2) (in step (4)).

The OFC that has received the indirect connect request (iCR) performs connect request processing, identifies the SGi, and identifies the IMSI using the IP address of the UE (in step (5)).

The OFC sends a connect response (Connect ACK) to the base station eNB+TOF1 (in step (6)).

The base station eNB+TOF1 identifies the VLAN connected to the transmission source (OFC 1 or OFC 2) of the connection response, from the connect response (Connect ACK) that has been received. The base station eNB+TOF1 transmits to the VLAN a packet to be offloaded.

The OFC performs flow entry setup of the OFS. For a downlink packet, the destination address of the header of the packet is rewritten. A MAC address rewriting entry (of an action of modifying the MAC address when there is a match with the rule) is set in the flow table of the OFS. For the uplink, a counter entry is added to the flow table of the OFS (in step (7)).

The UE transmits a data packet to the base station eNB+TOF1 (in step (8)). When the packet from the UE is a packet via the radio bearer with the QCI targeted for offloading, the eNB+TOF1 forwards the packet to the path of a traffic offloading destination (in step (9)). The eNB+TOF1 forwards a packet not to be offloaded to the SGW of the S/P-GW, and the packet is then forwarded from the PGW to the router (Router) through the OFS. The OFS transmits the packet forwarded through the offload path from the router (Router) to the PDN (in step (10)). Determination about offloading at the eNB+TOF1 may be made, based on the QCI of the packet, for example.

A packet received from the PDN through the router (Router) is forwarded to the OFS (in step (11)). The packet addressed to the UE is forwarded from the OFS to the base station eNB+TOF1 (in step (12)), and is radio-transmitted to the UE from the base station eNB+TOF1 (in step (13)).

<Addition Error of Offload Path>

Figure 7:
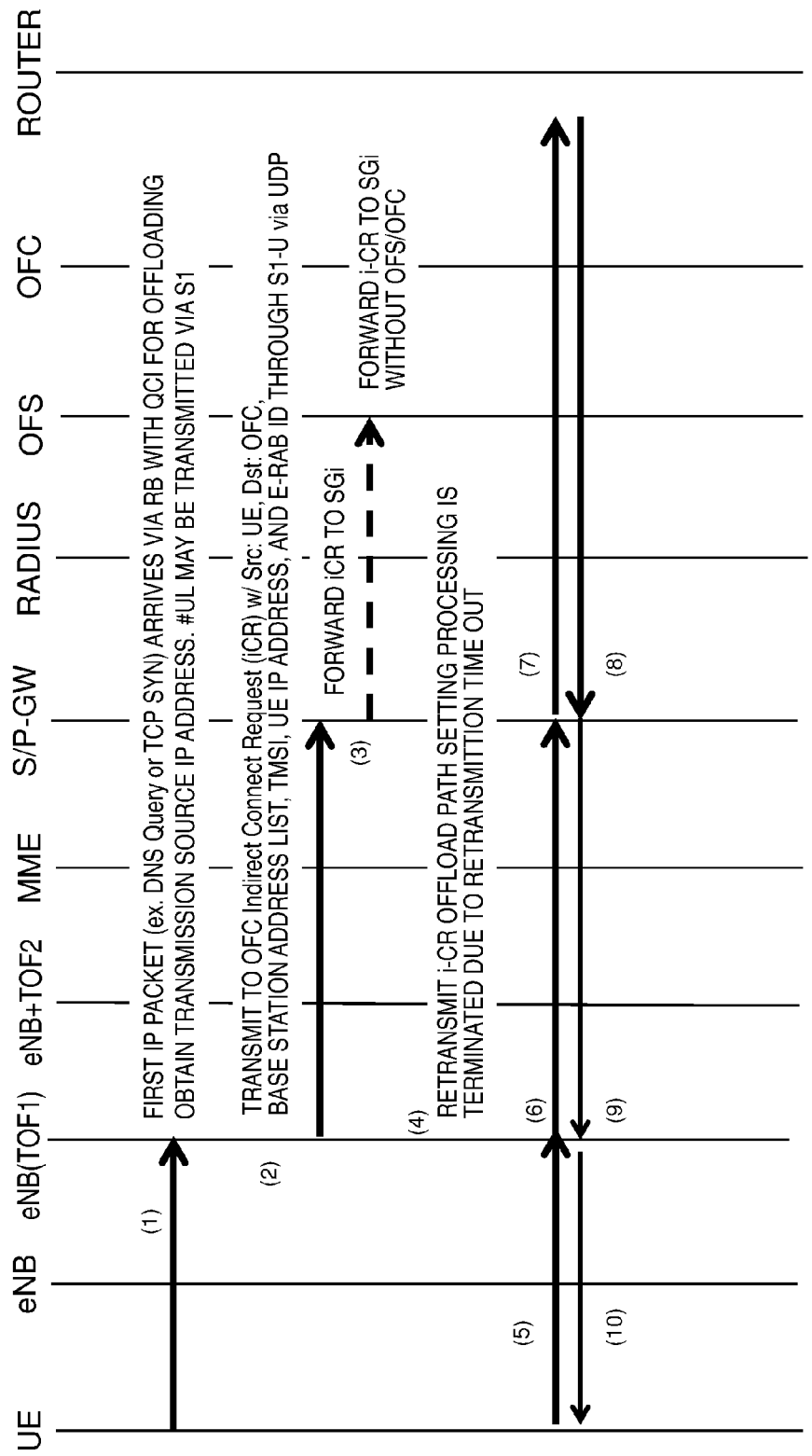
FIG. 7 is a diagram explaining an operation example of the one exemplary embodiment of the present invention.

FIG. 7 is a diagram illustrating an operation example when an addition error of an offload path occurs. FIG. 7 illustrates a procedure when no OFS/OFC connected to the SGi is present. It is assumed in this case as well that the procedure is applied to a region where private addresses overlap, for example, as in FIG. 6. The base station with offload function eNB+TOF1 sends an indirect connect request (indirect Connect Request) to the OFC to identify the offload path from a response transmitted from the OFC.

Steps (1) and (2) are the same as steps (1) and (2) in FIG. 6. The PGW outputs to the SGi the indirect connect request (iCR) from the base station with offload function eNB+TOF1. However, no OFS and no OFC are connected to the SGi. For this reason, the eNB+TOF1 retransmits the indirect connect request (iCR). However, no acknowledgement (Ack) is returned from the OFC. Assume that no acknowledgement is returned from the OFC even if the indirect connect request (iCR) is retransmitted from the eNB+TOF1 a predetermined retry number of times. Then, the retransmission is over (due to a retransmission time-out error), and additional processing with respect to the offload path is terminated. That is, a packet from the UE is forwarded from the S/P-GW to the PDN through the SGi and the router via the S1-U even if the packet is to be offloaded (in steps (5) to (7)). A packet received from the PDN through the router is forwarded to the S/P-GW (in step (8)), and is forwarded to the eNB+TOF1 from the S/P-GW (in step (9)), and is radio-transmitted to the UE from the eNB+TOF1 (in step (10)).

Next, some typical examples of handover (HO) processing in this exemplary embodiment will be described.

<HO from eNB without Offload Function to eNB+TOF with Offload Function>

Figure 8:
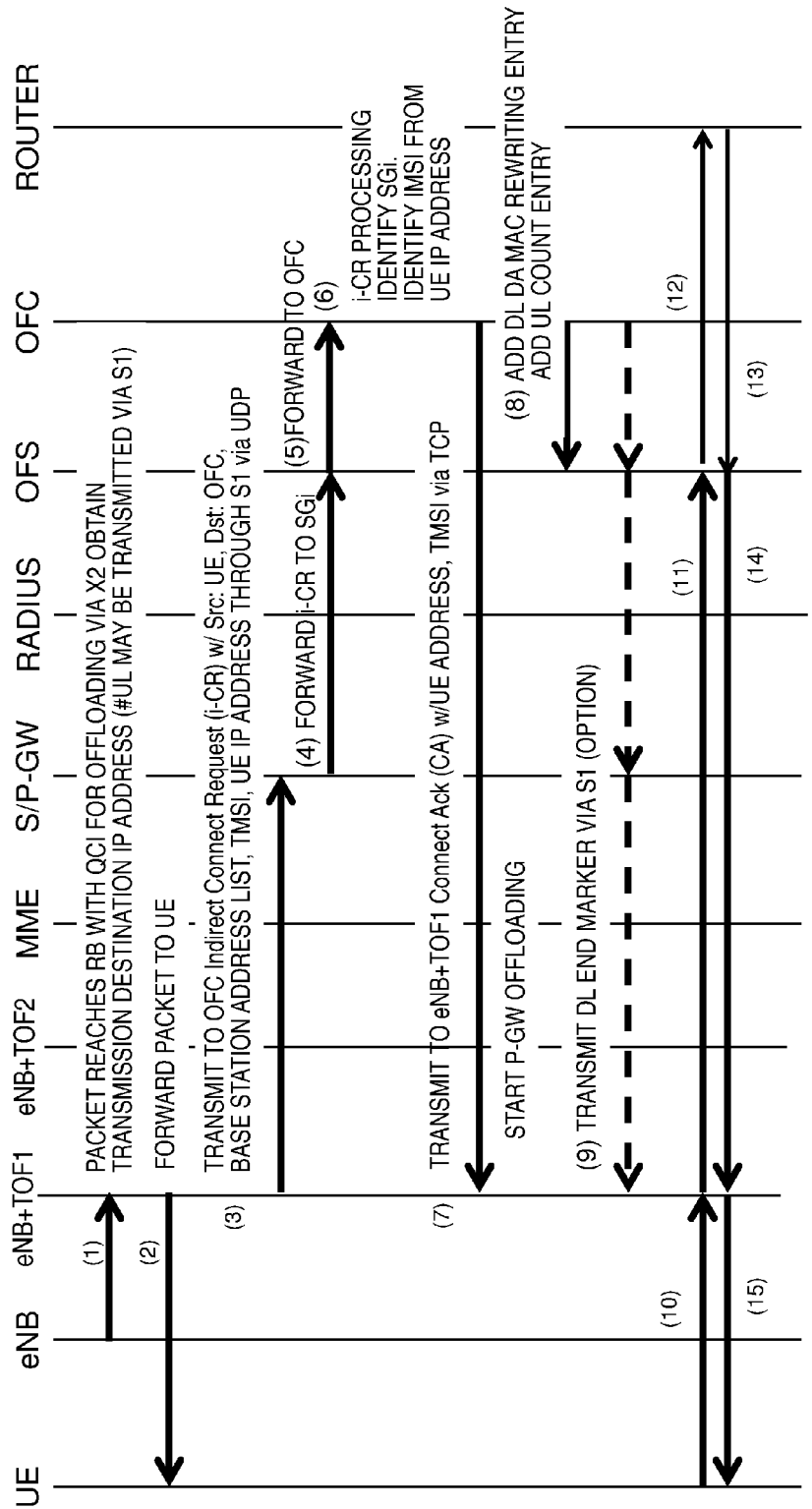
FIG. 8 is a diagram explaining an operation example of the one exemplary embodiment of the present invention.

A description will be given about a case where the UE hands over (implements an X2 handover) to an area of the eNB+TOF with the traffic offload function from an area of the eNB without the traffic offload function, with reference to FIG. 8. In an X2 handover, a handover between a mobile source eNB and a mobile destination eNB connected to a same MIME is implemented, using a connection interface X2 between the eNBs.

Though not limited thereto, the eNB (mobile source eNB) that has received results of measurements with respect to neighboring base stations from the UE determines the handover (HO). The eNB transmits a handover (HO) request to the eNB+TOF1 of a mobile destination. The mobile source eNB wirelessly transmits an instruction for the handover (HO) to the UE.

The mobile source eNB transmits to the mobile destination eNB+TOF1 a packet in transit and terminal information over the X2 (in step (1)). It is assumed that in this case, the packet has reached the radio bearer with QCI targeted for offloading via the X2.

The mobile destination eNB+TOF1 forwards the packet to the UE (in step (2)).

The mobile destination eNB+TOF1 transmits an indirect connect request (indirect Connect Request) (iCR) for the OFC to the S/P-GW through the S1-U interface by the UDP (User Datagram Protocol) (in step (3)). The indirect connect request (iCR) includes the transmission source UE, the destination OFC, the base station address list, the TMSI, the IP address of the UE, and the E-RABID, for example.

The S/P-GW outputs the indirect connect request (iCR) to the SGi to be forwarded to the OFS (in step (4)). The OFS forwards the indirect connect request (iCR) from the S/P-GW to the OFC (in step (5)).

The OFC receives the indirect connect request (iCR) and performs offload path connection processing, identifies the SGi, and identifies the IMSI using the IP address of the UE (in step (6)).

The OFC directly transmits a connect response (Connect ACK) including the IP address of the UE and TMSI information to the base station eNB+TOF1 by TCP (Transmission Control Protocol) (in step (7)). The base station eNB+TOF1 recognizes an offloading destination from the connect response (Connect ACK), and transmits a packet to be offloaded to the VLAN of the offloading destination.

The OFC performs flow entry setup of the OFS. For a downlink packet, a MAC address rewriting entry (action) for rewriting the destination MAC address of the header of the packet is set in the flow table of the OFS. For the uplink, a counter entry is added to the flow table of the OFS (in step (8)). The OFC may transmit an END Marker indicating the end of forwarding data to the eNB+TOF1 (in step (9)).

After the handover to the base station eNB+TOF1, an uplink data packet from the UE is offloaded at the base station eNB+TOF1 to bypass the core network to be forwarded to the OFS, and is then forwarded to the PDN through the router. A downlink packet that has reached the OFS from the PDN through the router bypasses the core network to be directly forwarded to the base station eNB+TOF1, and is then radio-transmitted to the UE (in steps (10) to (15)).

<HO Between Base Stations with Offload Functions: Updating of Offload Path>

Figure 9:
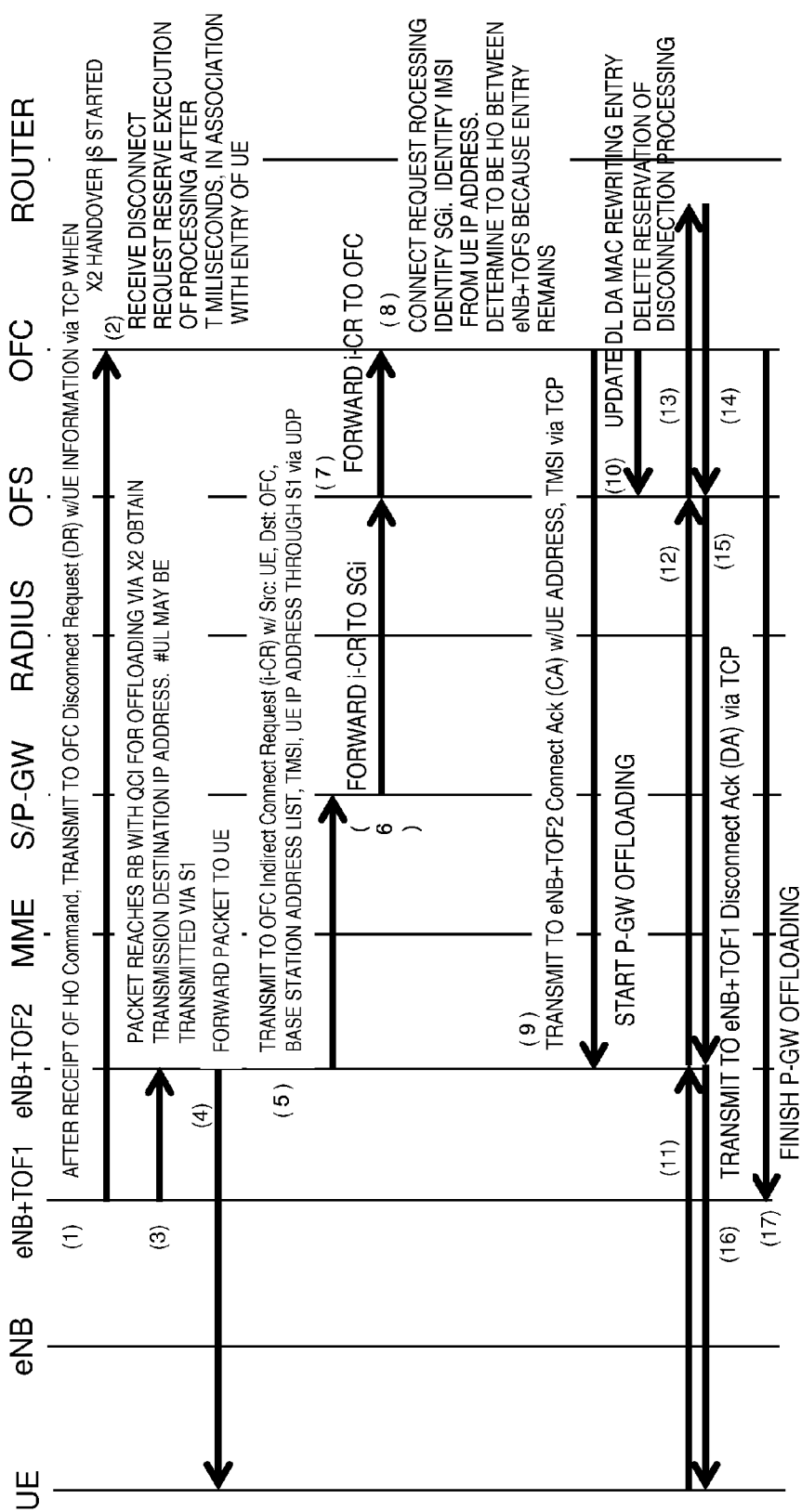
FIG. 9 is a diagram explaining an operation example of the one exemplary embodiment of the present invention.

A description will be given about a case where the UE performs a handover (X2 handover) between the base stations with the traffic offload functions, with reference to FIG. 9. It is assumed that private addresses of the OFSs and the OFCs connected to the different SGis overlap.

Upon receipt of a handover command (HO Command) from the MME, the eNB+TOF1 of a mobile source transmits a disconnect request (Disconnect request: DR) to the OFC through the OFS, by TCP (transmission control protocol) (in step (1)). The disconnect request (DR) includes UE information.

The OFC reserves processing of the disconnect request (that is, the OFC does not immediately disconnect connection with the mobile source eNB+TOF1 and starts a timer, in association with the entry of the UE, thereby reserving execution of disconnection processing after T milliseconds) (in step (2)). Herein, for the reservation, the disconnect request is registered in a command buffer (queue) or the like to set a wait state, and the disconnect request is extracted from the command buffer to execute the disconnection processing at the timeout.

The mobile source eNB+TOF1 transmits a user data packet to the radio bearer with the QCI targeted for offloading for the eNB+TOF2 of a mobile destination via the connection interface X2 between the eNBs (in step (3)). The mobile source eNB+TOF1 wirelessly transmits an instruction for the handover (HO) to the UE.

The mobile destination base station eNB+TOF2 forwards the user data packet to the UE.

The mobile destination eNB+TOF2 transmits an indirect connect request (indirect Connect Request) (iCR) addressed to the OFC to the S/P-GW through the S1 interface by the UDP (in step (5)). The indirect connect request (iCR) includes the transmission source UE, the destination OFC, a base station address list, the TMSI, the IP address of the UE, and the E-RABID.

The S/P-GW outputs the indirect connect request (iCR) to the SGi to be forwarded to the OFS (OFS1 or OFS2) (in step (6)). The OFS (OFS1 or OFS2) forwards the indirect connect request (iCR) from the PGW to the OFC (OFC1 or OFC2) (in step (7)).

The OFC (OFC1 or OFC2) executes processing of the connect request, identifies the SGi, and identifies the IMSI from the IP address of the UE. Since the disconnect request from the eNB+TOF1 remains in the entry of the UE, the OFC determines that the handover is between the eNB+TOFs.

The OFC transmits a connect response (Connect Ack) to the mobile destination eNB+TOF2 by TCP (in step (9)). The mobile destination eNB+TOF2 receives the connect response (Connect Ack), and identifies the offload path (VLAN).

The OFC performs flow entry setup of the OFS. For a downlink packet, a MAC rewriting entry (rule action) for rewriting the destination MAC address in the header of the downlink packet is set in the flow table of the OFS. The OFC adds a counter entry for the uplink to the flow table of the OFS, and further cancels the reservation of the disconnection processing (in step (10)). Offloading (PGW offloading) is thereby started at the mobile destination eNB+TOF2.

An uplink data packet from the UE is offloaded at the mobile destination eNB+TOF2, is forwarded to the OFS, and is then transmitted to the PDN. A downlink packet from the PDN is forwarded to the mobile destination eNB+TOF2 (in steps 11 to 16). The OFC returns a disconnect response (Disconnect Ack) to the mobile source eNB+TOF1 by TCP (in step (17)). Offloading at the mobile source eNB+TOF1 is finished, so that a packet from the UE is forwarded to the PDN 104 from the OFS and the router through the S/P-GW. A packet from the PDN 104 is transmitted to the UE via the eNB through the router, the OFS, and the S/P-GW.

<HO1 from Base Station with Offload Function to Base Station without Offload Function: Offload Path Deletion>

Figure 10:
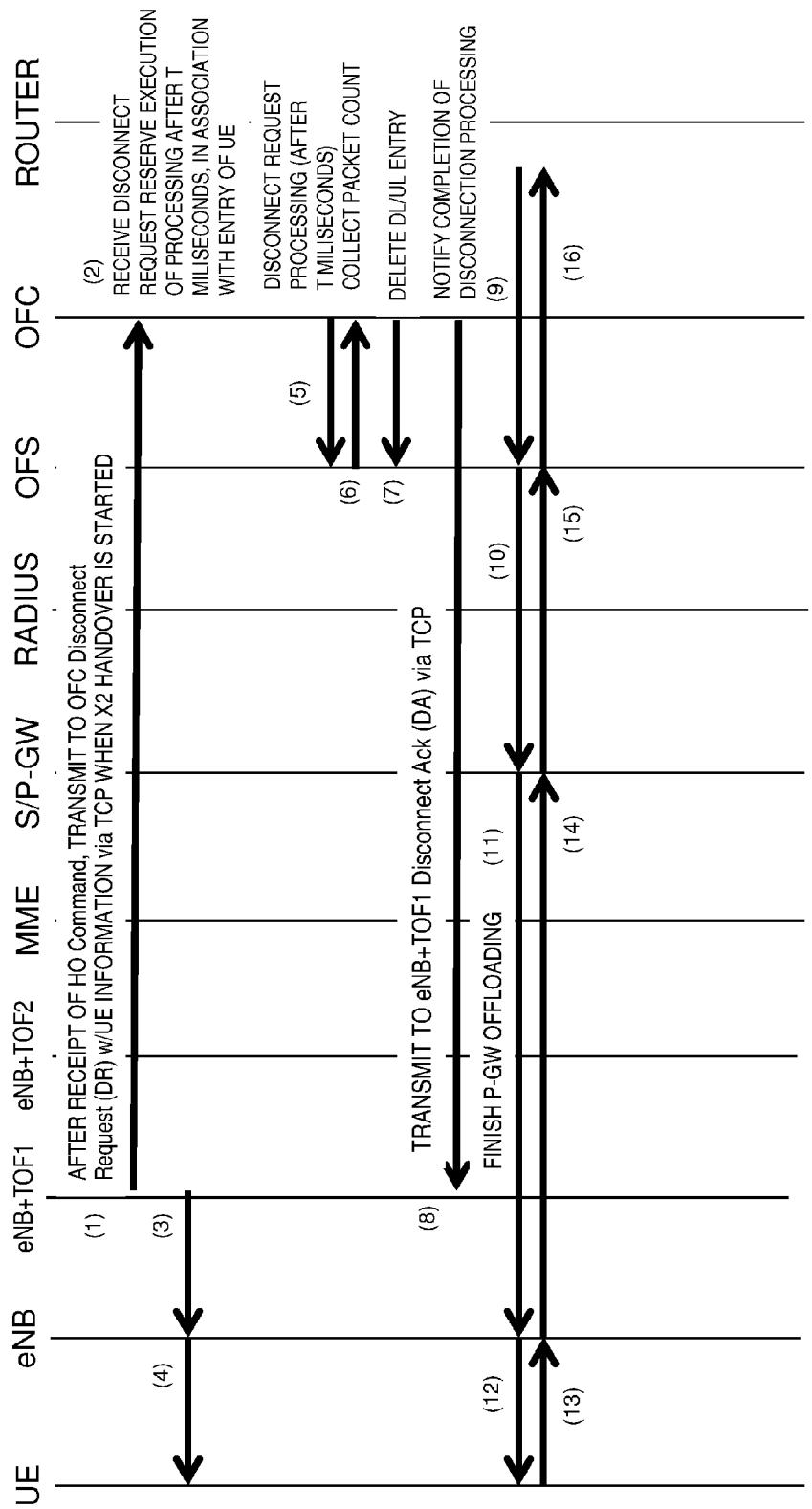
FIG. 10 is a diagram explaining an operation example of the one exemplary embodiment of the present invention.

A description will be given about a handover when the UE, which performs communication by offloading traffic at the base station with offload function eNB+TOF1, has moved to a service area of the base station eNB without offload function, with reference to FIG. 10.

Upon receipt of a handover command (HO Command) from the MME, the eNB+TOF1 of a mobile source transmits a disconnect request (Disconnect Request: DR) to the OFC through the OFS via by TCP (in step (1)). This disconnect request (DR) includes the UE information.

The OFC reserves disconnection processing (starts the timer, in association with the entry of the UE, thereby reserving execution of the disconnection processing after T milliseconds) (in step (2)). On the other hand, the mobile source eNB+TOF1 transmits a user data packet to the mobile destination eNB via the interface X2 for connection between the eNBs (in step (3)), and the mobile destination base station eNB wirelessly transmits the user data packet to the UE (in step (4)).

The OFC executes processing of the disconnect request after occurrence of the timeout of the timer (T milliseconds). The OFC collects a result of packet count from statistical information in the flow table of the OFS (in steps 5 and 6), and instructs the OFS to delete a downlink/uplink flow entry in the flow table (in step (7)).

The OFC notifies to the mobile source eNB+TOF1 a disconnect response (Disconnect Ack: DA) indicating completion of disconnection by TCP (in step (8)).

When a packet is supplied from the PDN to the OFS through the router (in step (9)), the packet is forwarded from the OFS to the PGW and the SGW (in step (10)), is forwarded from the SGW to the mobile destination eNB (in step (11)), and is then radio-transmitted to the UE (in step (12)). A packet from the UE is forwarded from the eNB to the OFS through the S/P-GW, and is then transmitted to the PDN from the router (in steps 13 to 16).

<HO2 from Base Station with Offload Function to Base Station without Offload Function: Offload Path Deletion>

Figure 11:
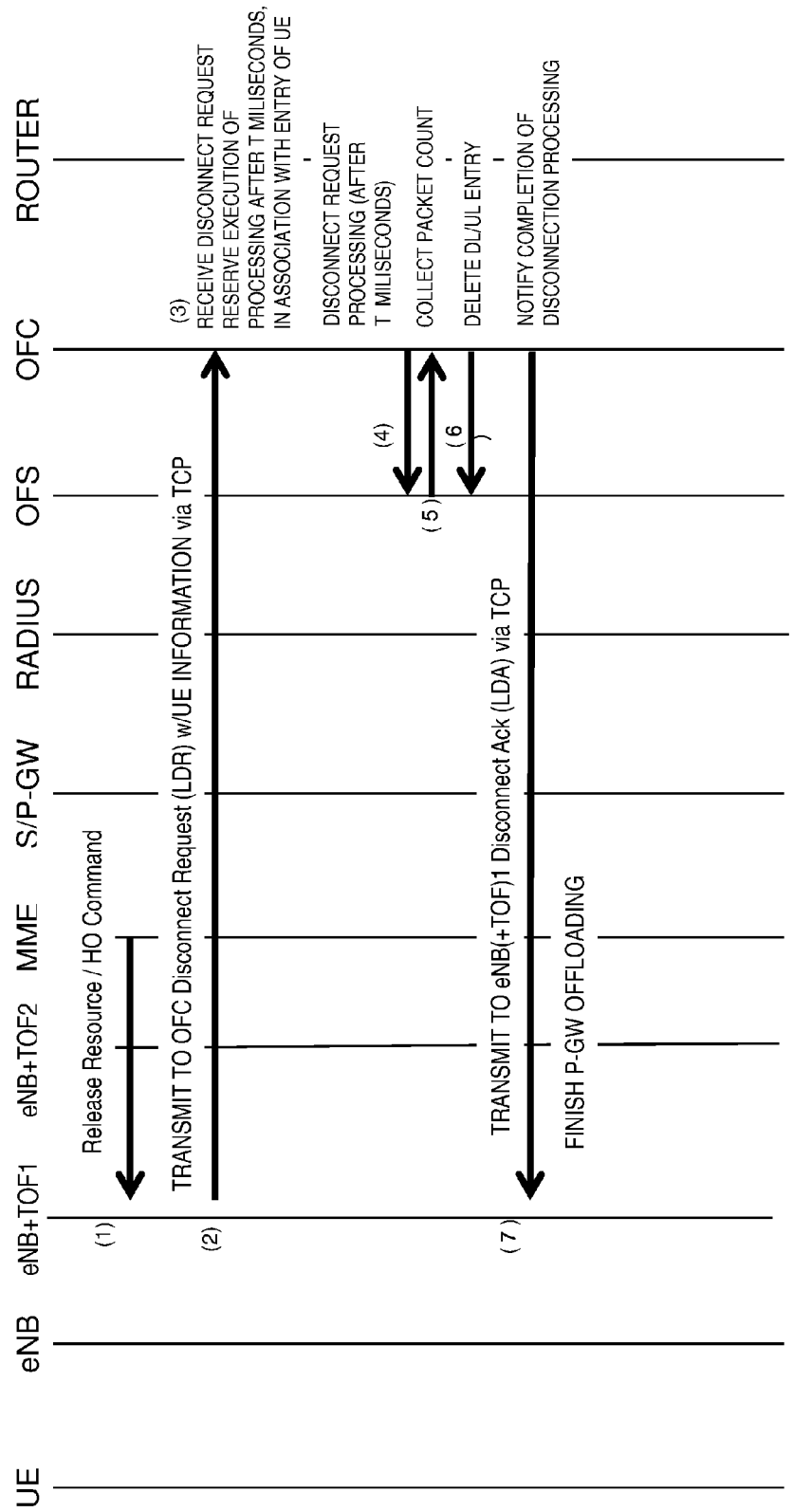
FIG. 11 is a diagram explaining an operation example of the one exemplary embodiment of the present invention.

A description will be given about a handover when the UE, which performs communication by offloading traffic at the base station with offload function eNB+TOF1, has moved to the service area of the base station eNB without offload function, with reference to FIG. 11. It is assumed that in the example in FIG. 11, a user data packet that should be transmitted via the X2 interface is not present. This assumption is different from that in the case of FIG. 10.

Upon receipt of a resource release/handover command (HO Command) from the MME (in step (1)), the eNB+

TOF1 of a mobile source transmits a disconnect request (Disconnect Request: DR) to the OFC through the OFS, by TCP (in step (2)). The disconnection information (DR) includes the UE information.

The OFC reserves processing of the disconnect request (starts the timer, in association with the entry of the UE, thereby reserving execution of disconnection processing after T milliseconds (T being a preset value) (in step (3)).

The OFC executes the processing of the disconnect request after the timeout of T milliseconds (in step (4)). The OFC collects a packet count from statistical information in the flow table of the OFS (in step (5)), and instructs the OFS to delete a downlink/uplink entry in the flow table (in step (6)).

The OFC notifies a disconnect response (Disconnect Ack) to the mobile source eNB+TOF1, by TCP (in step (7)).

Since communication connection is not made with the mobile destination eNB, the procedure is finished by offload path deletion.

<HO3 from Base Station with Offload Function to Base Station without Offload Function>

Figure 12:
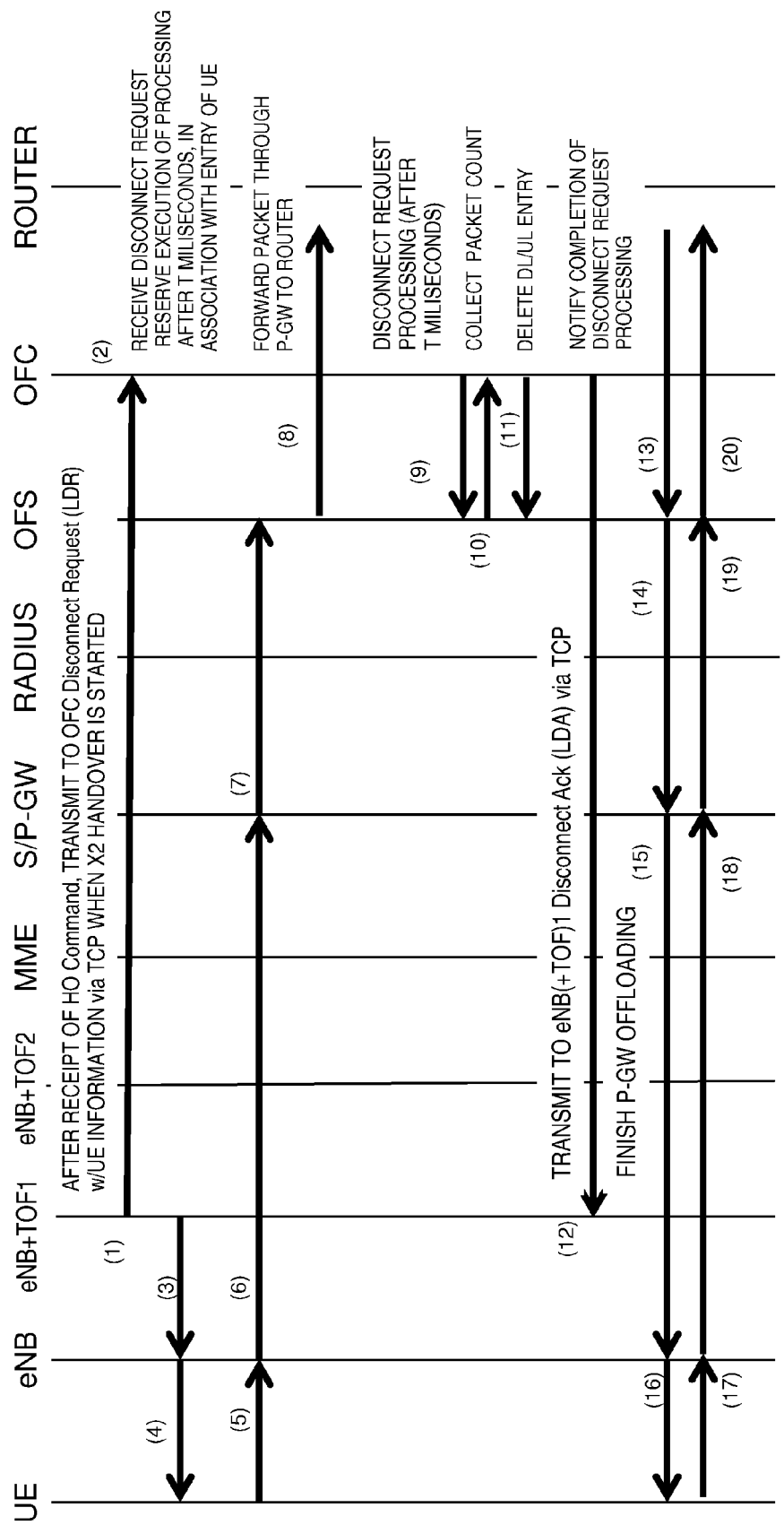
FIG. 12 is a diagram explaining an operation example of the one exemplary embodiment of the present invention.

A description will be given about a handover when the UE, which communicates traffic by offloading the traffic at the base station with offload function eNB+TOF1, has moved to the service area of the base station eNB without the offload function, with reference to FIG. 12.

When starting an X2 handover procedure after receiving a handover command (HO Command) from the MME, the eNB+TOF1 of a mobile source transmits a disconnect request (Disconnect Request: DR) to the OFC through the OFS, by TCP (in step (1)). The disconnect request (DR) includes the UE information. The OFC reserves processing of the disconnect request (starts the timer, in association with the entry of the UE, thereby reserving execution of disconnection processing after T milliseconds) (in step (2)).

A packet is transmitted from the mobile source eNB+TOF1 to the mobile destination eNB via the interface X2 for connection between the eNBs (in step (3)). Then, the packet is radio-transmitted to the UE from the mobile destination eNB (in step (4))

A packet transmitted from the UE is forwarded through the eNB and the S/P-GW, and is then forwarded to the router from the OFS (in steps 5 to 8).

The OFC performs processing of the disconnect request after the timeout of T milliseconds. The OFC collects a packet count from statistical information in the flow table of the OFS (in steps 9 and 10), and instructs the OFS to delete a downlink/uplink flow entry in the flow table (in step (11)).

The OFC notifies a disconnect response (Disconnect Ack) to the mobile source eNB+TOF1 by TCP, thereby terminating offloading (in step (12)).

When a packet is supplied from the PDN to the OFS through the router (in step (13)), the packet is forwarded from the OFS to the PGW and the SGW (in step (14)), is forwarded from the SGW to the mobile destination eNB (in step (15)), and is then radio-transmitted to the UE (in step (16)). A packet from the UE is forwarded from the eNB to the OFS through the S/P-GW, and is then transmitted to the PDN from the router (in steps (17) to (20)).

<HO from Base Station with Offload Function (in E-UTRAN) to UTRAN: CS FallBack (CS Fallback), SRVCC (Single Radio Voice Call Continuity): Offload Path Deletion>

In CSFB, a handover from an LTE network to a 3G (2G) network is made to perform CS communication only when CS (Circuit Switched) call control is executed. A UE hands over from the EUTRAN to a UTRAN. A signal indicating presence of an incoming call is transmitted from a transmission source G-MSC (gateway mobile switching center) to an MSC (Mobile Switching Center)/VLR (Visited Location Register) through a CS network, for example. In the MSC/VLR, an associated MME is identified from information on the incoming call, and then a paging signal (Paging-Request-message) is transmitted to the MME. The MME transmits the paging signal to an eNB. This paging signal includes information indicating CS service calling. The UE recognizes this information (CS service calling), and transmits a CS service request signal to the MME. The MME transmits a handover command (HO Command). The UE executes a procedure for the handover, and also hands over to the 3G network. An SRVCC handover from the LTE to a 3G(2G) area also takes place to continue the voice call.

Figure 13:
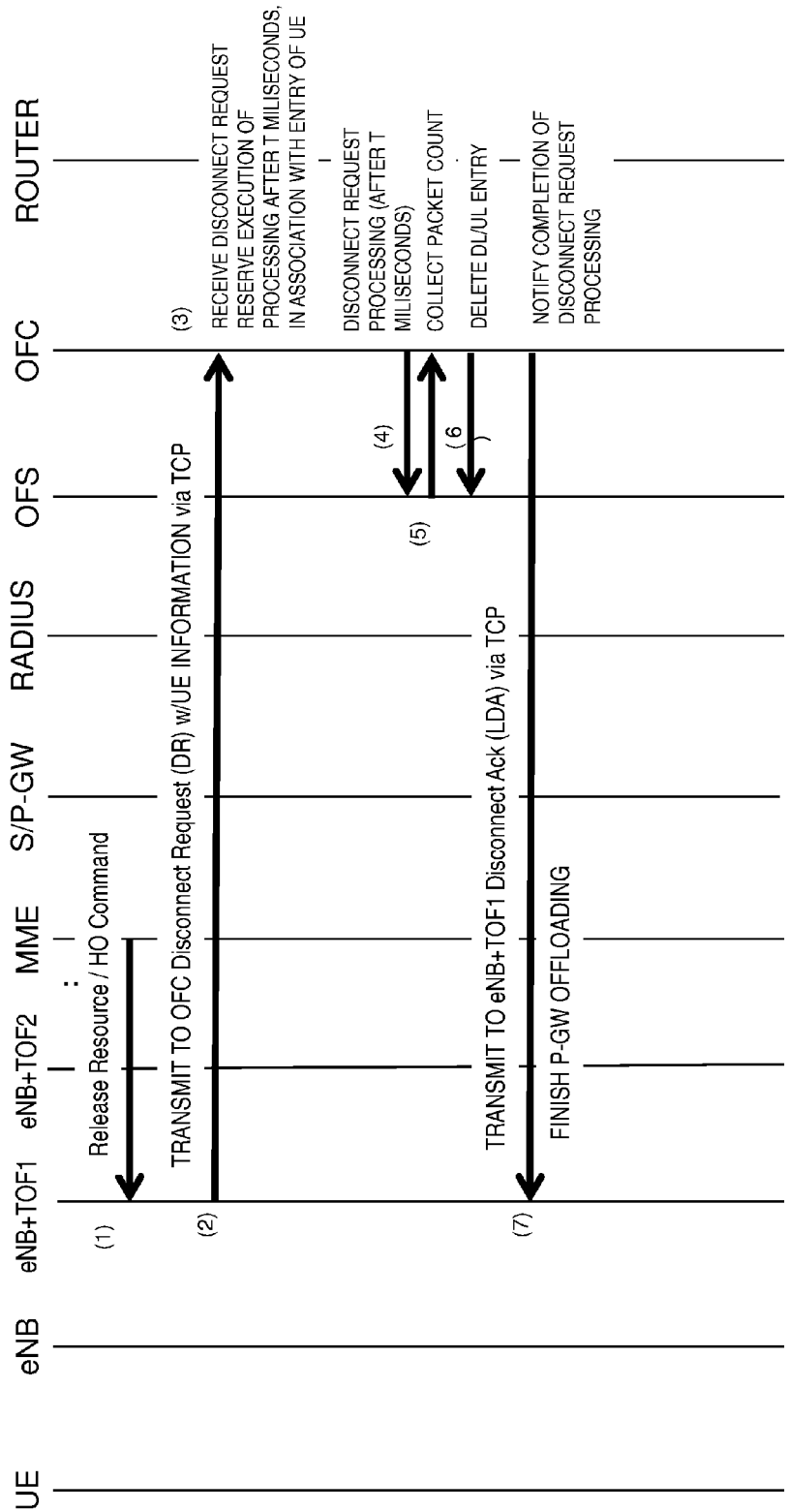
FIG. 13 is a diagram explaining an operation example of the one exemplary embodiment of the present invention.

A description will be given about an operation at a time of finishing traffic offloading when the UE, which communicates traffic by offloading the traffic at the base station with offload function eNB+TOF1, hands over to the UTRAN, using the CSFB, with reference to FIG. 13.

Upon receipt of a resource release/handover command (HO command) is from the MME (in step (1)), the eNB+TOF1 of a mobile source transmits a disconnect request (DR) to the OFC through the OFS, by TCP (in step (2)). The disconnect request (Disconnect Request: DR) includes the UE information. The eNB+TOF1 releases an S1 connection with the MME.

The OFC reserves processing of the disconnect request (starts the timer, in association with the entry of the UE, thereby reserving execution of disconnection processing after T milliseconds) (in step (3)).

The OFC executes the processing of the disconnect request after the timeout of T milliseconds. The OFC collects a packet count from statistical information in the flow table of the OFS (in steps (4) and (5)) and instructs the OFS to delete a downlink/uplink entry in the flow table (in step (6)).

The OFC notifies a disconnect response (Disconnect Ack) to the eNB+TOF1, by TCP (in step (7)). With the above-mentioned arrangement, offload path disconnection is performed, so that the UE communicates with the 3G(2G) network.

<Offload Path Deletion at Transition to ECM-IDLE>

Figure 14:
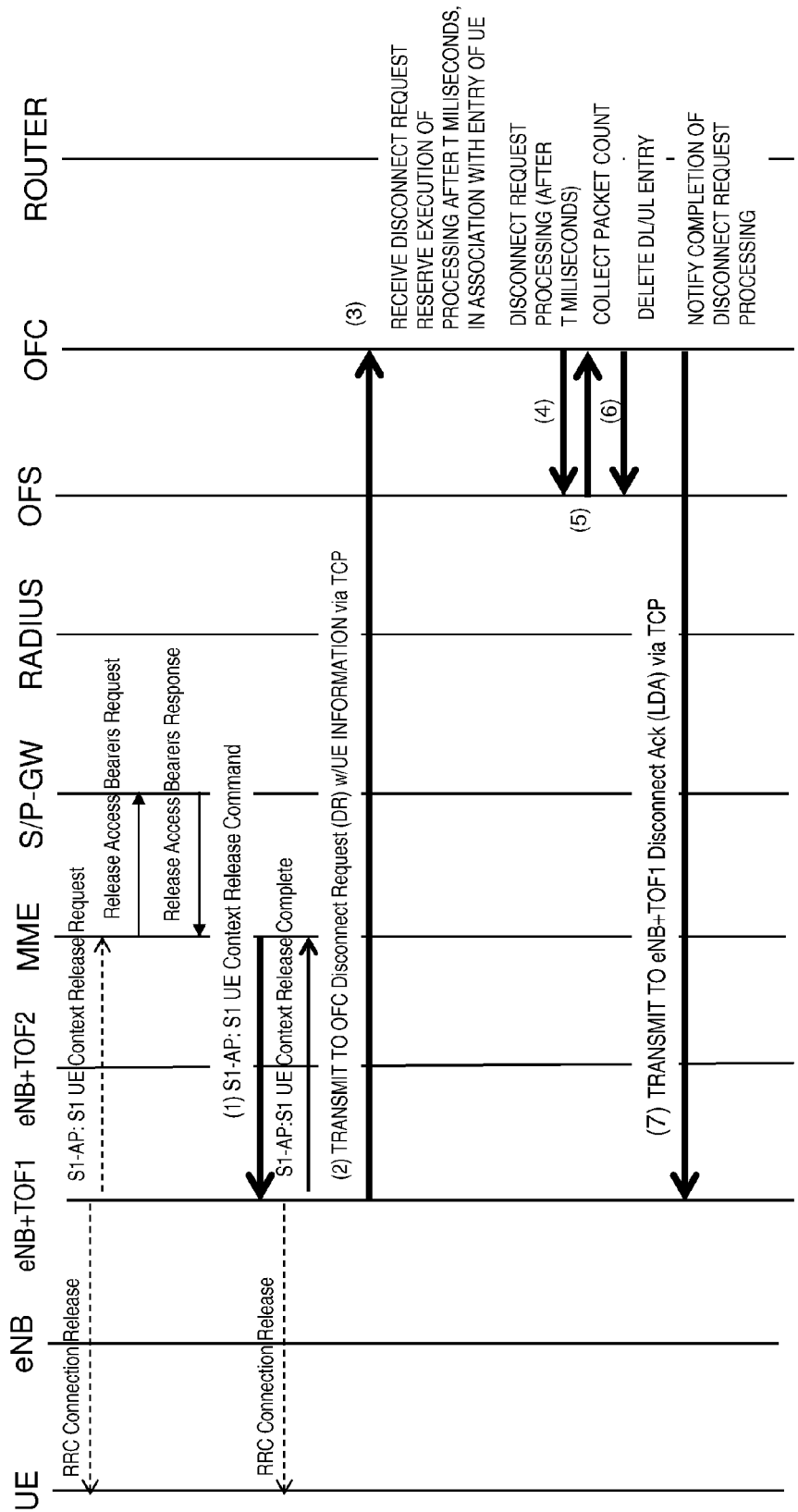
FIG. 14 is a diagram explaining an operation example of the one exemplary embodiment of the present invention.

FIG. 14 is a diagram illustrating offload path deletion at a transition to ECM-IDLE. An S1 release procedure is referenced in FIG. 5.3.5-1: S1 Release Procedure and so forth in Non Patent Literature 3.

The MME transmits a release access bearer request (Release Access Bearers request) to the SGW to release an S1-U bearer. In an S1-release conducted by the eNB, the eNB transmits an S1-AP: S1 UE Context Release Request to the MME. The SGW deletes eNB-related information (such as the address and the tunnel identifier (Tunnel Endpoint Id: TEID), and transmits a release access bearer response (Release Access Bearers Response to the MME.

The MME transmits an S1-AP S1 UE context release command message (S1 UE Context Release Command (cause)) to the base station eNB+TOF1 to release the S1 (in step (1)). The base station eNB+TOF1 confirms S1 Release, and transmits an S1 UE Context Release Complete message to the MME. When an RRC connection (RRC Connection) is not released, the eNB+TOF1 transmits an RRC Connection Release message to the UE. Upon receipt of the message of the S1-AP S1 UE Context Release Command message from the MME, the eNB+TOF1 of a mobile source transmits a disconnect request (DR) to the OFC through the OFS, by TCP (in step (2)). The disconnect request (DR)

includes the UE information. The eNB+TOF1 releases the S1 connection with the MME.

The OFC reserves processing of the disconnect request (starts the timer, in association with the entry of the UE, thereby reserving execution of disconnection processing after T milliseconds).

After the timeout of T milliseconds, the OFC executes the processing of the disconnect request. The OFC collects a packet count from statistical information in the flow table of the OFS (in steps (4) and (5)), and instructs the OFS to delete a downlink/uplink flow entry in the flow table (in step (6)).

The OFC notifies a disconnect response (Disconnect Ack) to the mobile source eNB+TOF1 by TCP (in step (7)). In this manner, the offload path is disconnected at the transition of an ECM-connected state (ECM Connected) to the ECM-idle state (ECM Idle). Paging to the UE in the ECM-idle state and ISR (Idle mode signaling Reduction) are processed by the MME, the SGSN, or the like. The ISR is a function of omitting registration of a 3G/LTE location. Even if a radio access system has been changed, the location registration is omitted by the ISR function unless a change in a location registration area that has been registered before (where the UE and the MME or the SGSN are connected to the same PDN) is made.

Second Exemplary Embodiment

Figure 19:
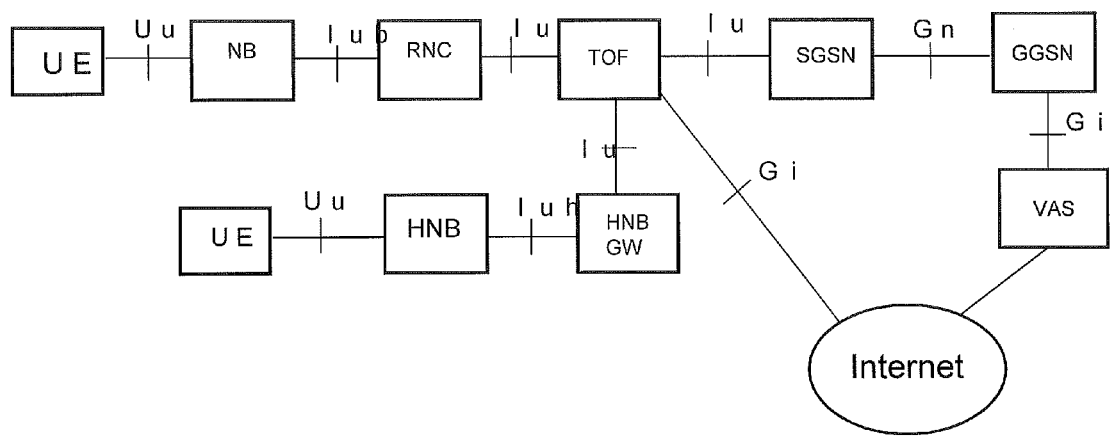
FIG. 19 is a diagram explaining 3GPP SIPTO Solution 4.

FIG. 15 is a diagram explaining a second exemplary embodiment. In this exemplary embodiment, the inapplicability to mobility control is overcome by applying the above-mentioned mobility control of OpenFlow to 3GPP SIPTO solution 4 described with reference to FIG. 19. In the 3GPP SIPTO solution 4 in FIG. 19, NAT is needed. However, in the exemplary embodiment using the OpenFLow, the NAT is not needed.

Referring to FIG. 15, a TOF (Traffic Offload) 124 arranged on an Iu-PS interface receives from a UE 121 traffic (packet) to a radio access network UTRAN (including an NB 122 and an RNC 123), and forwards a packet to be offloaded to an OFS 105 through an offload path 127. The TOF124 forwards a non-offload packet (not to be offloaded) to an SGSN 125. The SGSN 125 and an SGW 103S are connected by an S4 interface. Referring to FIG. 15, an eNB 102, the OFS 105, an OFC 106, a router 109, and a PDN 104 are the same as those described with reference to FIG. 2 and so forth. Though the SGW 103S and a PGW 103P are separately arranged, the SGW 103S and the PGW 103P may be integrated, as in FIG. 2. Referring to FIG. 15, a GGSN (not illustrated) may be connected to the SGSN 125, an OFS (not illustrated) may be arranged on an interface Gi between the GGSN and the PDN, and traffic (packet) to the radio access network UTRAN (including the NB 122 and the RNC 123) from the UE 121 may be offloaded at the TOF124 to be forwarded to the OFS (not illustrated) ahead of the GGSN (not illustrated), for transmission to the PDN. The packet offloaded at the TOF124 may be forwarded to the OFS 105 through a virtual switch (VSW) (IP routing can be configured by incorporating the virtual switch (VSW) as a network device, in addition to physical network interfaces in a management domain). Alternatively, the virtual switch (VSW) may be constituted from an OFS, for example, and the OFS may be controlled by the OFC indicated by a broken line (OFC different from the OFC 106 may be used) to accommodate extensibility of a system configuration or the like. According to this exemplary embodiment, addition of the SGSN, the SGW, the PGW or the like due to an increase in traffic is reduced.

Third Exemplary Embodiment

FIG. 16 is a diagram explaining a third exemplary embodiment. In this exemplary embodiment, a traffic offload (TOF) function is added to a femto-gateway 133. Data traffic (packet) to be offloaded is forwarded to an OFS 105 through an offload path 137 configured to bypass a core network, and is then forwarded to a PDN 104 through a router 109. Data traffic forwarded to the OFS 105 from the PDN 104 through the router 109 is forwarded to the femto-gateway 133, bypassing the core network, and is then forwarded to a femtocell base station (femtocell access point) (FAP) 131 through a network 132. Referring to FIG. 16, an MSC (Mobile Switching Center) and a CS (Circuit Switched) core are a line exchanger and a line exchanging network connected to a BSC (Base Station Controller: base station controller). A CSCF (Call Session Control Function) and an IMS (Internet Multimedia Services) core constitute an IP multi-media system (see FIG. 4.0 in Non Patent Literature 4 of 3GPP TS 23.228 V11.6.0 (2012 September). An HLR (Home Location Registry)/HSS is a subscriber information database. According to this exemplary embodiment, addition of an SGSN, an SGW, a PGW, or the like due to an increase in femtocell traffic is reduced.

<Base Station>

A base station eNB includes the functionality of user-plane header-compression and encryption. The base station eNB hosts each layer of the physical layer (PHY), the media access control (MAC: Media Access Control) layer, the radio link control (RLC: Radio Link Control) layer, and the packet data control protocol (PDCP: Packet Data Control Protocol) layer. The eNB provides radio resource control (RRC: Radio Resource Control) functionality corresponding to the control plane. Further, the eNB performs functions including radio resource management, admission control, scheduling, enforcement of negotiated UL-QoS (Uplink Quality of Service), cell information broadcast, ciphering and deciphering of user and control plane data, compression and decompression of DL/UL (downlink/uplink) user plane packet headers. The eNB is also connected to an SGW via an S1-U interface.

Figure 17:
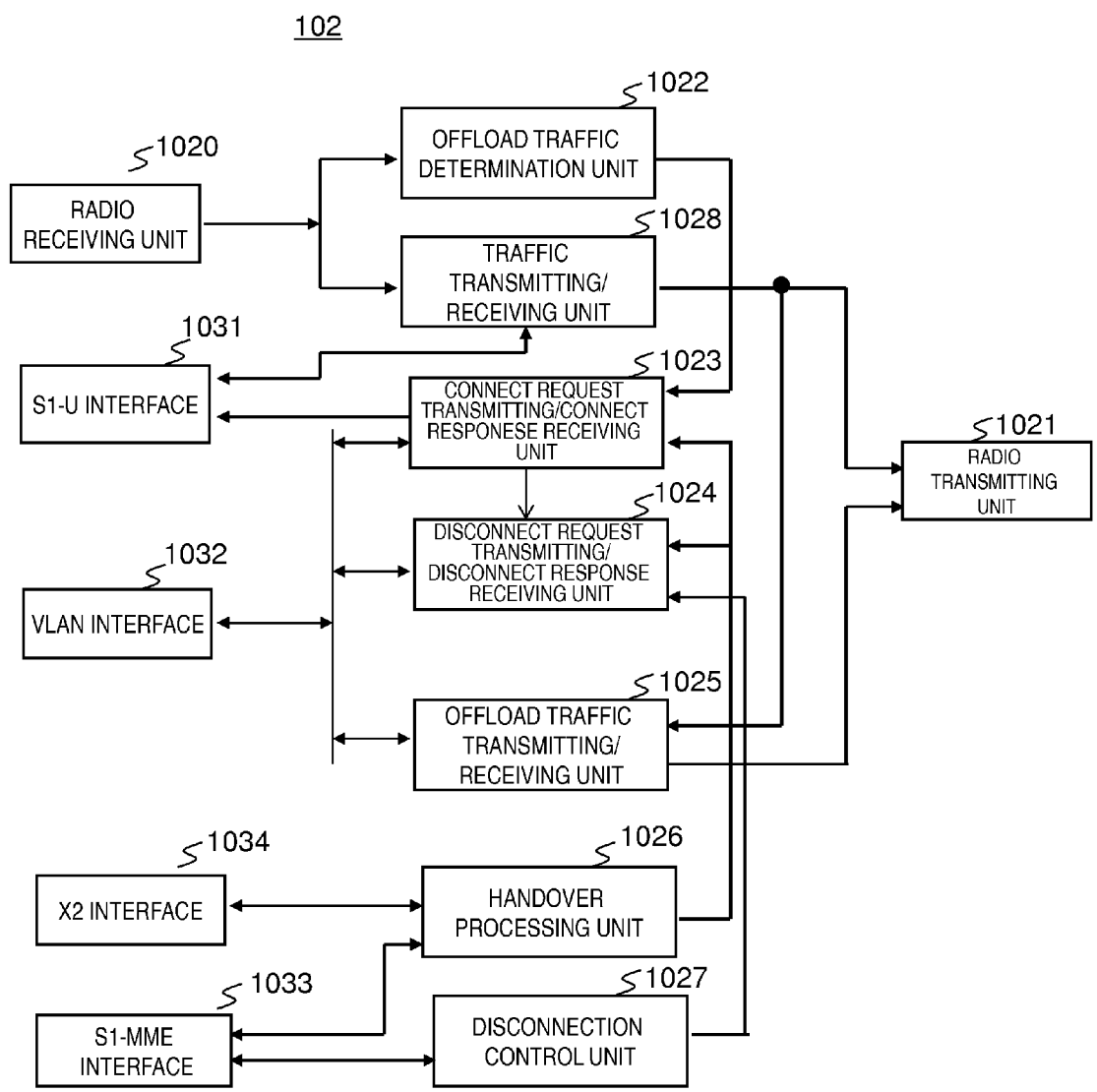
FIG. 17 is a diagram illustrating a configuration of a base station with offload function in the further another exemplary embodiment of the present invention.

FIG. 17 schematically illustrates an example of a configuration of a base station (eNB+TOF) 102 to which a traffic offload (TOF) function is added. FIG. 17 schematically describes the base station (eNB+TOF) 102. As a matter of course, a functional configuration, a block configuration, a signal connection, and the like of the base station (eNB+TOF) 102 are not each limited to such a configuration. Referring to FIG. 17, an offload traffic determination unit 1022 determines whether or not a packet (packet transmitted from a UE) from a radio bearer, which has been received by a radio receiving unit 1020, is an offload target or not, based on an QCI targeted for offloading, for example. When the packet is the offload target, a connect request transmitting/connect response receiving unit 1023 transmits an indirect connect request (Indirect Connect Request) to the OFS through an S1-U interface 1031, according to an instruction (control signal) from the offload traffic determination unit 1022. Alternatively, the connect request transmitting/connect response receiving unit 1023 transmits a connect request (Connect Request) to the OFS through a VLAN interface 1032. Also when a handover to an eNB+TOF is performed, the connect request transmitting/connect response receiving unit 1023 transmits an indirect connect request (indirect Connect Request) to the OFS through the S1-U interface 1031, under control of a handover processing unit 1026. The connect request transmitting/connect response receiving unit 1023 also transmits a connect request (Connect Request) to the OFS through the VLAN interface 1032, under control of the handover processing unit 1026. The connect request transmitting/connect response receiving unit 1023 receives a connect response from the OFC from the VLAN interface 1032. A disconnect request transmitting/disconnect response receiving unit 1024 transmits a disconnect request (indirect disconnect request) to the OFC through the VLAN interface 1032. The disconnect request transmitting/disconnect response receiving unit 1024 transmits a disconnect request to the OFC through the VLAN interface 1032, under control of the handover processing unit 1026 at a time of a handover, or according to an instruction (control signal) from a disconnection control unit 1027 at a transition to ECM-IDLE. The disconnect request transmitting/disconnect response receiving unit 1024 receives a disconnect response from the OFC through the VLAN interface 1032.

Out of traffic (packets) determined to be offload targets by the offload traffic determination unit 1022, a packet (uplink packet) from the UE, which has been received by the radio receiving unit 1020, is forwarded from a traffic transmitting/receiving unit 1028 to an offload traffic transmitting/receiving unit 1025, as uplink traffic to be offloaded. The offload traffic transmitting/receiving unit 1025 forwards the uplink traffic to be offloaded to the OFS, through the VLAN interface 1032. The offload traffic transmitting/receiving unit 1025 outputs downlink traffic to be offloaded, which has been received through the VLAN interface 1032, to a radio transmitting unit 1021. Then, the downlink traffic is radio-transmitted to the UE from the radio transmitting unit 1021.

Out of traffic (packets) determined to be non-offload by the offload traffic determination unit 1022, a packet (uplink packet) from the UE, which has been received by the radio receiving unit 1020, is output to the S1-U interface 1031 through the traffic transmitting/receiving unit 1028 and is then transmitted to the PDN through an S/P-GW, the OFS, and the router. A downlink packet that has been received through the S1-U interface 1031 is output to the radio transmitting unit 1021 through the traffic transmitting/receiving unit 1028, and is radio-transmitted to a UE. Though the radio transmitting unit 1021 and the radio receiving unit 1020 are illustrated as separate blocks in FIG. 17, for convenience of preparation of the drawing, the radio transmitting unit 1021 and the radio receiving unit 1020 are configured to be combined in a single unit. The radio receiving unit 1020 and the radio transmitting unit 1021 include an RF (Radio Frequency) unit such as a transmitting/receiving antenna, a TX (transmitting unit) and an RX (receiving unit), a modulation/demodulation unit, a baseband processing unit, a communication controller, a transmitting/receiving buffer, and so forth. Each unit in FIG. 18 performs a sequence operation of the OFC described with reference to each of FIGS. 4 to 14. A part or all of processing and functions of the offload traffic determination unit 1022, the traffic transmitting/receiving unit 1028, the connect request transmitting/connect response receiving unit 1023, the disconnect request transmitting/disconnect response receiving unit 1024, the offload traffic transmitting/receiving unit 1025, the handover processing unit 1026, the disconnection control unit 1027 may be implemented by a program to be executed on a computer constituting the base station. The program is stored and held in a medium (not illustrated) such as a semiconductor memory, a magnetic disk, or an optical disk, and is provided.

<OFC>

Figure 18:
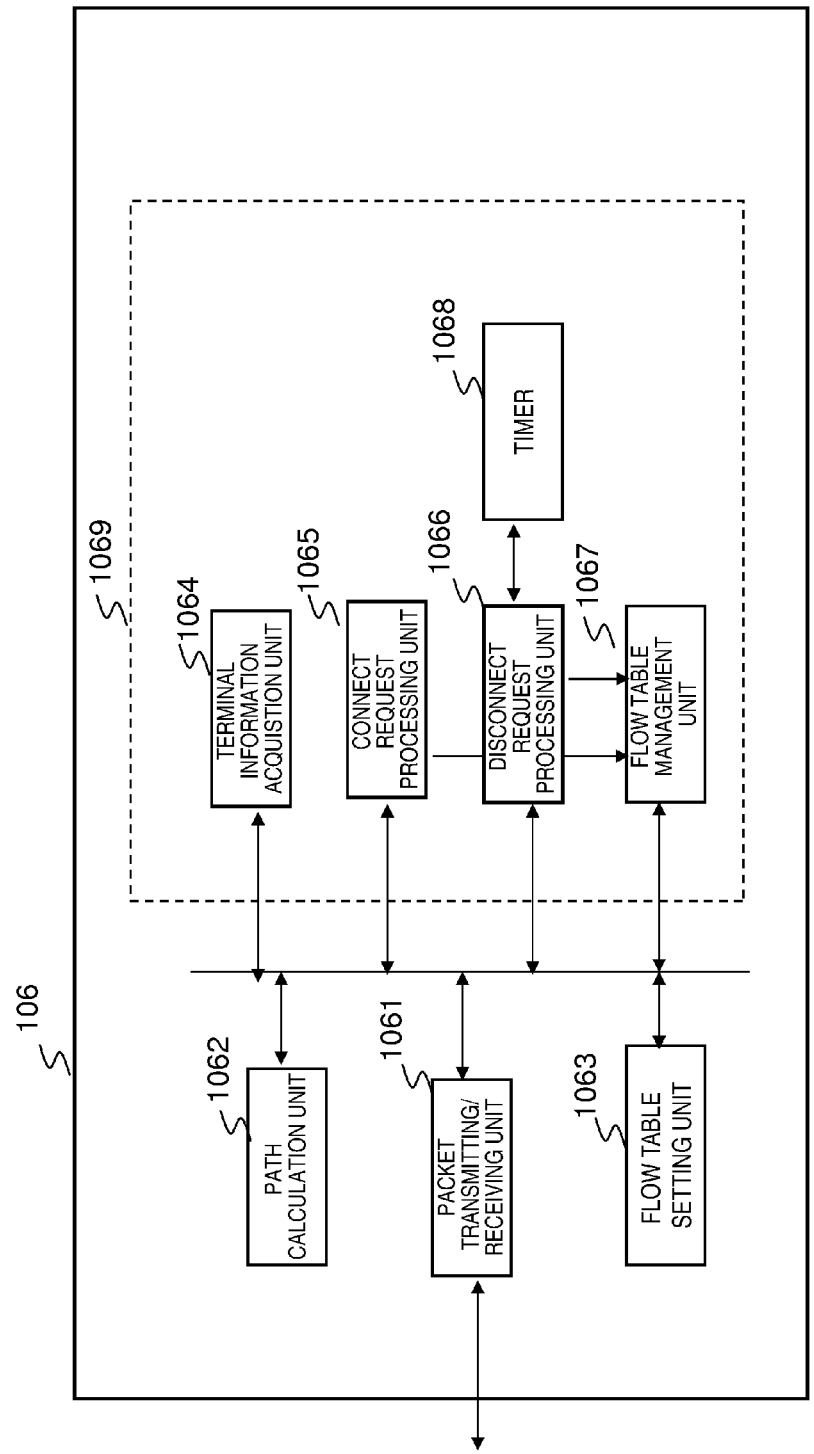
FIG. 18 is a diagram illustrating a configuration of an OFC in the further another exemplary embodiment of the present invention.

FIG. 18 is a diagram schematically illustrating a configuration example of the OFC 106 in the above-mentioned exemplary embodiment. Referring to FIG. 18, a packet transmitting/receiving unit 1061 configured to transmit and receive a packet from the OFS, a path calculation unit 1062 configured to calculate a flow for forwarding the packet, and a flow table setting unit 1063 configured to set a flow table of each OFS on the flow according to the flow calculated by the path calculation unit 1062 are in accordance with the configuration of an existing OFC. The OFC 106 in the exemplary embodiment further includes an offload control unit 1069, in addition to the configuration of the existing OFC.

The offload control unit 1069 includes:

a terminal information acquisition unit 1064 configured to obtain terminal information of the UE from the packet forwarded from the OFS configured to hook handshaking with an authentication server, in attach processing to the network of the base station with offload function;

a connect request processing unit 1065 configured to process a connect request (Connect Request) or an indirect connect request (Indirect Connect Request) from the base station with offload function to perform offload path addition and return a connect response to the base station with offload function;

a disconnect request processing unit 1066 configured to process a disconnect request (Disconnect Request) forwarded from the base station with offload function to perform offload path deletion and return a deletion response to the base station with offload function; and a flow table management unit 1067 configured to control entry addition, entry deletion, a change in a path, and so on of the flow table of the OFS due to the connection processing (offload path addition) by the connect request processing unit 1065 and the offload path deletion by the disconnect request processing unit 1066, and transmit the entry addition, the entry deletion, the change in the path, and so on to the OFS through the flow table setting unit 1063. A timer 1068 is a timer configured to measure a waiting period (of T milliseconds) from receipt of the disconnect request by the disconnect request processing unit 1066 to execution of disconnection processing and notify a timeout after an elapse of the T milliseconds. The offload control unit 1069 performs the sequence operation of the OFC described with reference to each of FIGS. 4 to 14. A part or all of processing and functions of each unit of at least the offload control unit 1069 may be implemented by a program to be executed on a computer constituting the OFC. The program is stored and held in a medium (not illustrated) such as a semiconductor memory, a magnetic disk, or an optical disk, and is provided.

In each of the exemplary embodiments, the offloading determination function is implemented in the OFC. Offloading determination means or the like may be implemented in the MME, the SGSN, or the like. An offload function configured to offload a received packet may be implemented in the base station (in the first exemplary embodiment), the TOF arranged on the Iu-PS interface, or the SIPTO gateway (SIPTO-GW), or the like.

Fourth Exemplary Embodiment

Figure 21:
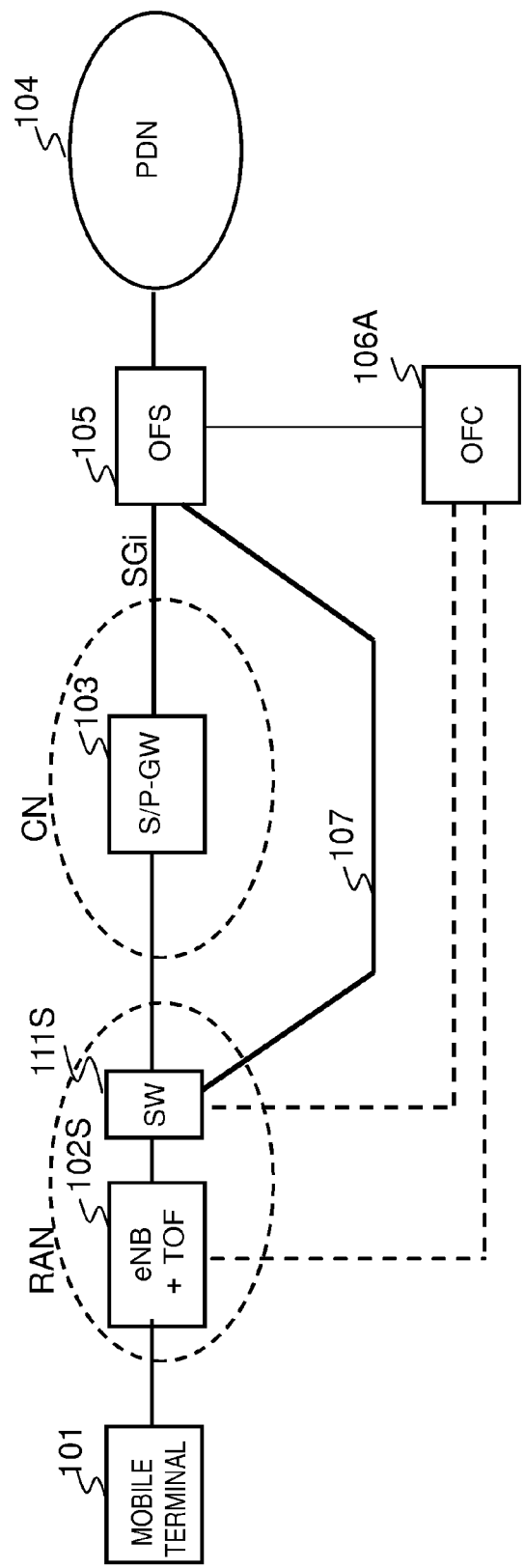
FIG. 21 is a diagram explaining an overview (another mode) of the present invention.

FIG. 21 is a diagram explaining an exemplary embodiment corresponding to the mode in FIG. 20B. Referring to FIG. 21, a same reference sign is assigned to an element which is the same as that in FIG. 1. The fourth exemplary embodiment is different from the first exemplary embodiment in that the fourth exemplary embodiment includes a base station with offload function (eNB+TOF) 102S and a switch 111S configured to perform switching to an offload path. The switch 111S may be an OpenFlow switch (OFS), a virtual switch (Virtual Switch: VSW), or the layer 2 switch in FIG. 3. When the switch 111S is constituted from the OFS, path setting of the switch 11S is controlled from an OFC 106A. That is, the path setting is controlled by entry setting/deletion of the flow table of the OFS from the OFC 106A. As a matter of course, a configuration in which the switch 111S is incorporated into the base station with offload function (eNB+TOF) 102S may be employed as a variation example of this exemplary embodiment. In this case, the base station with offload function (eNB+TOF) 102S has an offload path setting function.

Upon receipt of an offload instruction from the OFC 106A, the base station with offload function (eNB+TOF) 102S determines whether or not a received packet is an offload target, and forwards the packet of the offload target to the offload path. Transmission of a connect request (Connect Request) with respect to the offload path, receipt of a response, transmission of a disconnect request (Disconnect Request), receipt of a response, and so forth from the base station with offload function (eNB+TOF) 102S to the OFC 106A are basically in accordance with the sequence described with reference to each of FIGS. 4 to 14, for example. When the connect request from the base station with offload function (eNB+TOF) 102S to the OFC 106A is forwarded through a network node (such as an S/P-GW 103) in a core network (CN), the connect request is forwarded in the form of an indirect connect request (indirect Connect Request). In this exemplary embodiment, a configuration is employed in which a received packet from a radio bearer for offloading is forwarded to an offload path 107 when the instruction of offloading is received from the OFC 106A. Control of offloading and simplification of the configuration thus become possible.

As a variation example of the fourth exemplary embodiment, a configuration may be employed in which an offload control function (offloading determination means) performed by the OFC 106A is incorporated into the base station with offload function (eNB+TOF) 102S. It may be so configured that different OFCs are used for controlling the OFS 105 and for controlling the base station with offload function (eNB+TOF) 102S.

At least part of the above-mentioned exemplary embodiments are supplemented as follows (but are not limited to the following).

(Supplementary Note 1)

A network system, comprising:

a node having a function of offloading a traffic for a first network; and a switch arranged between a gateway node of the first network and a second network, wherein when the traffic is offloaded, the switch connects the node to the second network through an offload path configured to bypass the first network; and when the traffic is not offloaded, the node connects to the first network and the switch connects the gateway node of the first network to the second network.

(Supplementary Note 2)

The network system according to Supplementary Note 1, comprising:

a control apparatus configured to control the switch.

(Supplementary Note 3)

The network system according to Supplementary Note 2, wherein the node having the traffic offload function is a base station of a radio access network.

(Supplementary Note 4)

The network system according to Supplementary Note 3, wherein when determining a packet that has arrived from a mobile terminal via a radio bearer corresponds to an offload target, the node transmits to the control apparatus a connect request of the offload path through the switch; and the control apparatus performs setting on the switch such that a packet that has been forwarded from the node is forwarded to the second network and that a packet from the second network is forwarded to the node, upon reception of the connect request from the node, and returns a connect response to the node.

(Supplementary Note 5)

The network system according to Supplementary Note 4, wherein the control apparatus obtains information on the mobile terminal, based on information transmitted and received between the gateway node and an authentication server when authentication due to attachment from the mobile terminal is performed.

(Supplementary Note 6)

The network system according to Supplementary Note 5, wherein the network system comprises:

a plurality of sets of at least the switch and the control apparatus between the gateway node and the second network;

when private addresses of the control apparatuses and the switches of first and second ones of the sets connected to at least first and second interfaces between the gateway node and the second network overlap, the node transmits the connect request to the control apparatus through the first network, the gateway node, and the switch of the first or second set; and the node identifies the path to the switch of an offloading destination from a path through which the node has received the connect response from the control apparatus.

(Supplementary Note 7)

The network system according to any one of Supplementary Notes 4 to 6, wherein when the mobile terminal hands over from a mobile source base station without the traffic offload function to a mobile destination base station with the traffic offload function, the mobile destination base station transmits to the control apparatus a connect request of the offload path, through the switch; and upon reception of the connect request, the control apparatus performs setting on the switch such that a packet forwarded from the node is forwarded to the second network and that a packet from the second network is forwarded to the mobile destination base station, and returns a connect response to the mobile destination base station.

(Supplementary Note 8)

The network system according to any one of Supplementary Notes 4 to 6, wherein when the mobile terminal hands over from a mobile source base station with the traffic offload function to a mobile destination base station with the traffic offload function, the mobile source base station transmits a disconnect request for deleting the offload path to the control apparatus through the switch;

the mobile destination base station transmits a connect request to an offload path to the control apparatus through the switch;

upon reception of the connect request, the control apparatus performs setting on the switch such that a packet forwarded from the node is forwarded to the second network and that a packet from the second network is forwarded to the mobile destination base station, and returns a connect response to the mobile destination base station; and the control apparatus performs disconnection processing of the offload path for the mobile source base station, and returns a disconnect response to the mobile source base station.

(Supplementary Note 9)

The network system according to any one of Supplementary Notes 4 to 6, wherein when the mobile terminal hands over from a mobile source base station with the traffic offload function to a mobile destination base station without the traffic offload function, the mobile source base station transmits a disconnect request for deleting the offload path to the control apparatus through the switch; and the control apparatus performs disconnection processing of the offload path of the mobile source base station and returns a disconnect response to the mobile source base station.

(Supplementary Note 10)

The network system according to Supplementary Note 8 or 9, wherein the control apparatus performs the disconnection processing after a delay of a predetermined period set in advance by a timer upon reception of the disconnect request of the offload path from the base station.

(Supplementary Note 11)

The network system according to Supplementary Note 10, wherein when the mobile terminal hands over from the mobile source base station with the traffic offload function to the mobile destination base station without the traffic offload function, the mobile source base station transmits the disconnect request for deleting the offload path to the control apparatus through the switch; and upon reception of the disconnect request, the control apparatus transmits a data packet received from the second network before timeout of the timer to the mobile destination base station via an inter-base-station interface to be transmitted to the mobile terminal.

(Supplementary Note 12)

The network system according to Supplementary Note 4, wherein when a handover configured to perform fallback is performed from a mobile source base station with the traffic offload function to a different first network, the mobile source base station transmits a disconnect request for deleting the offload path to the control apparatus through the switch, and the control apparatus performs disconnection processing of the offload path of the mobile source base station, and returns a disconnect response to the mobile source base station.

(Supplementary Note 13)

The network system according to Supplementary Note 4, wherein upon reception of a predetermined command from a node configured to manage mobility of the mobile terminal, the base station transmits a disconnect request for deleting the offload path to the control apparatus through the switch, and the base station of a mobile source transmits the disconnect request for deleting the offload path to the control apparatus through the switch; and the control apparatus performs disconnection processing of the offload path of the base station of the mobile source and returns a disconnect response to the base station of the mobile source.

(Supplementary Note 14)

The network system according to Supplementary Note 1 or 2, wherein the node having the traffic offload function is arranged on an interface between a radio rink controller and the first network.

(Supplementary Note 15)

The network system according to Supplementary Note 1 or 2, wherein the node having the traffic offload function is a femto-gateway configured to connect a femtocell and the first network.

(Supplementary Note 16)

A network control method, comprising:

when traffic is offloaded using a node configured to offload the traffic for a first network and a switch arranged between a gateway node of the first network and a second network, connecting the node to the second network through an offload path for bypassing the first network, by the switch; and when the traffic is not offloaded, connecting to the first network by the node, and connecting the gateway node of the first network to the second network by the switch.

(Supplementary Note 17)

A base station apparatus, wherein the base station apparatus comprises:

means that transmits, to a switch arranged between a gateway node of a first network and a second network, a connect request with respect to an offload path configured to bypass the first network, directly or through the first network, when the base station apparatus determines that a packet which has arrived from a mobile terminal via a radio bearer corresponds to an offload target;

the connect request is transmitted from the switch to a control apparatus to perform connection processing, and the offload path and the second network are connected through the switch; and the base station apparatus includes means that transmits a disconnect request of the offload path to the switch upon reception of a predetermined command from a node configured to manage mobility of the mobile terminal, and the disconnect request is transmitted from the switch to the control apparatus, so that the offload path is disconnected.

(Supplementary Note 18)

The base station apparatus according to Supplementary Note 17, wherein the base station apparatus comprises:

means that transmits to the switch the connect request of the offload path directly or through the first network, when a mobile destination base station apparatus is a base station with an offload function at a time of a handover by the mobile terminal; and the connect request is transmitted from the switch to the control apparatus to perform the connection processing, and the offload path and the second network are connected through the switch.

(Supplementary Note 19)

The base station apparatus according to Supplementary Note 17 or 18, comprising:

means that transmits to the switch the disconnect request of the offload path when a mobile source base station apparatus is a base station with the offload function, and the offload path is connected at the time of the handover by the mobile terminal.

(Supplementary Note 20)

A control apparatus configured to control a switch arranged between a gateway node of a first network and a second network and comprising:

means for configuring the switch such that a packet forwarded from a base station apparatus to an offload path is forwarded to the second network and that a packet from the second network is forwarded to the node through the offload path, when receiving from the base station apparatus through the switch a connect request of the offload path configured to bypass the first network, and returning a connect response to the base station apparatus; and means for configuring the switch such that the gateway node of the first network is connected to the second network when receiving from the base station apparatus through the switch a disconnect request of the offload path, and returning a disconnection response to the base station apparatus.

Each disclosure of the above-listed Non Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and the like) are possible within the scope of the claims of the present invention. That is, the present invention naturally includes various variations and modifications that could be made by those skilled in the art according to the overall disclosure including the claims and the technical concept.

What is claimed is:

1. A network system comprising:
a switch unit arranged between a first network and a second network; and
an offloading determination unit that determines whether or not to perform offloading of a traffic for the first network, and that, when it is determined to perform offloading, configures an offload path that bypasses the first network, for the switch,
a packet to be offloaded being forwarded between the offload path and the second network through the switch, when the traffic for the first network is offloaded.

2. The network system according to claim 1, wherein network system further comprises:
an offloading unit that offloads the traffic for the first network, wherein, when the traffic is offloaded, the offloading unit forwards the packet to be offloaded to the offload path, from which the packet is transmitted to the second network through the switch.

3. The network system according to claim 2, comprising a control apparatus including the offloading determination unit, the control apparatus configured to control the switch; and the offloading unit provided in a base station of a radio access network.

4. The network system according to claim 3, wherein, when the control apparatus determines that the offloading is necessary, the control apparatus instructs the switch to forward the packet to be offloaded to the offload path configured to connect the base station and the second network.

5. The network system according to claim 3, wherein, when a packet from a mobile terminal is via a radio bearer for offloading, the offloading unit of the base station makes a request for configuring the offload path to the offloading determination unit of the control apparatus.

6. The network system according to claim 3, wherein, when a packet that arrives from a mobile terminal via a radio bearer is to be offloaded, the offloading unit of the base station transmits a connect request of the offload path to the control apparatus through the switch, and
the offloading determination unit of the control apparatus receives the connect request, performs setting on the switch such that a packet forwarded from the base station to the switch through the offload path is forwarded to the second network and that a packet from the second network is forwarded from the switch to the base station through the offload path, and returns a connect response to the base station.

7. The network system according to claim 6, wherein at a time of a handover by the mobile terminal, the control apparatus performs offload path disconnection for a mobile source station and performs offload path setting for a mobile destination base station, according to whether the mobile source base station offloads the traffic for the first network or the mobile destination base station includes the offloading unit, with respect to the mobile source base station and the mobile destination base station.

8. The network system according to claim 6, wherein upon reception of a preset predetermined command from a node configured to manage mobility of the mobile terminal, the base station transmits a disconnect request for deleting the offload path to the control apparatus through the switch, and
the control apparatus performs disconnection processing of the offload path and returns a disconnect response to the base station.

9. The network system according to claim 2, comprising a node including the offloading determination unit, the node configured to manage mobility of a mobile terminal, and
the offloading unit provided in base station of a radio access network and/or in a gateway node configured to offload a selected packet.

10. The network system according to claim 2, wherein the offloading unit is provided in a node on an interface between a radio link controller and the first network.

11. The network system according to claim 10, wherein the offloading determination unit and the offloading unit are provided in the node.

12. The network system according to claim 2, wherein the offloading unit is provided in a femto-gateway configured to connect a femtocell and the first network.

13. The network system according to claim 12, wherein the offloading determination unit, together with the offloading unit, are provided in the femto-gateway.

14. The network according to claim 1, wherein the offloading determination unit and the offloading unit are provided in a base station of a radio access network.

15. A network system, comprising:
an offloading unit that offloads a traffic for a first network; and
an offloading determination unit that instructs the offloading unit to offload the traffic for the first network, wherein
upon reception of an instruction of the offloading, the offloading unit determines whether or not to offload a received packet, and forwards the packet to an offload path that bypasses the first network.

16. The network system according to claim 15, wherein the offloading determination unit is provided in a control apparatus configured to control a switch, and
the offloading unit is provided in a base station of a radio access network.

17. The network system according to claim 16, wherein, when a packet from the mobile terminal is a packet via a radio bearer for offloading, the offloading unit of the base station forwards the packet to the offload path.

18. The network system according to claim 16, wherein, when the offloading determination unit of the control apparatus determines that the offloading of the traffic for the first network is necessary,
the offloading determination unit instructs the offloading unit of the base station to forward the packet to be offloaded to the offload path.

19. The network system according to claim 16, wherein, when the packet from a mobile terminal comprises a packet via a radio bearer for offloading, the offloading unit of the base station makes a request for configuring the offload path to the offloading determination unit of the control apparatus.

20. The network system according to claim 16, wherein the network system further comprises:
a second switch arranged between the first network and a second network, when the traffic is offloaded, the offloading determination unit of the control apparatus instructs the second switch to forward the packet to be offloaded to the offload path, configured to connect the base station and the second network.

21. A base station apparatus comprising:
a unit that, when offloading a traffic for a core network, transmits a request for configuring an offload path that bypasses the core network to a node including an offloading determination unit to determine whether or not to perform offloading of a packet received from a mobile terminal, and
a unit that forwards the received packet to the offload path when the offloading is performed.

22. A base station apparatus comprising:
a unit that receives an offload instruction from an offloading determination unit that instructs offloading of a traffic for a core network;
a unit that determines whether or not to perform offloading of a packet received from a mobile terminal; and
a unit that forwards the packet to be offloaded to an offload path that bypasses the core network, when the offloading is performed.

23. A control apparatus comprising:
a unit that receives a request for configuring an offload path from an offloading unit that performs offloading of a traffic for a first network;
a unit that configures the offload path that bypasses the first network and connects to a second network, for a switch connected between the first network and the second network.

24. A control apparatus comprising:
a unit that transmits an offload instruction to an offloading unit that performs offloading of a traffic for a first network, upon reception of a request for configuring an offload path from the offloading unit; and
a unit that causes the offloading unit to offload a received packet to be offloaded to the offload path configured to bypass the first network.

25. A network control method comprising:
determining whether or not to offload traffic for a first network and, when the offloading is performed;
configuring an offload path to bypass the first network for switch arranged between the first network and a second network; and
forwarding a packet to be offloaded between the offload path and the second network through the switch, when the traffic for the first network is offloaded.

26. The network control method according to claim 25, comprising:
when the traffic for the first network is offloaded, forwarding to the offload path the packet to be offloaded, and further transmitting the packet to the second network through the switch.

27. A network control method comprising:
upon reception of an offload instruction by an offloading unit from an offloading determination unit that determines whether or not to perform offloading of a traffic for a first network;
determining whether or not to perform offloading of a received packet; and
when the offloading of the received packet is performed, forwarding the received packet to an offload path to bypass the first network.

28. The network control method according to claim 27, comprising:
configuring the offload path for a switch arranged between a first network and a second network, by the offloading determination unit, the offload path being configured to connect to the second network by bypassing the first network.

29. A non-transitory computer readable recording medium storing therein a program for causing a computer comprising a base station apparatus to execute processing comprising:
when a packet that arrives from a mobile terminal via a radio bearer is to be offloaded,
transmitting, to a switch arranged between a first network and a second network, a connect request of an offload path configured to bypass the first network, directly or through the first network; and
transmitting to the switch a disconnect request of the offload path, when a predetermined command is received from a node configured to manage mobility of the mobile terminal.

30. A non-transitory computer readable recording medium storing therein a program for causing a computer comprising a control apparatus configured to control a switch arranged between a first network and a second network to execute processing comprising:
upon reception, from a base station apparatus through the switch, a connect request of an offload path configured to bypass the first network, configuring the switch such that a packet forwarded from the base station apparatus to the offload path is forwarded to the second network and that a packet from the second network is forwarded to the offload path, and returning to the base station apparatus a connect response for the connect request of the offload path; and upon reception from the base station apparatus through the switch a disconnect request of the offload path, configuring the switch such that a gateway node of the first network is connected to the second network, and returning to the base station apparatus a disconnect response for the disconnect request of the offload path.

* * * * *